US009244533B2

(12) United States Patent
Friend et al.

(10) Patent No.: US 9,244,533 B2
(45) Date of Patent: Jan. 26, 2016

(54) CAMERA NAVIGATION FOR PRESENTATIONS

(75) Inventors: Joseph F. Friend, Bothell, WA (US); Christopher Hugh Pratley, Seattle, WA (US); Ashok Kuppusamy, Seattle, WA (US); Steven Bathiche, Kirkland, WA (US); Robert Scott Dietz, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 12/640,731

(22) Filed: Dec. 17, 2009

(65) Prior Publication Data

US 2011/0154266 A1   Jun. 23, 2011

(51) Int. Cl.
| | |
|---|---|
| *G06F 3/01* | (2006.01) |
| *A63F 13/20* | (2014.01) |
| *G09B 5/02* | (2006.01) |

(Continued)

(52) U.S. Cl.
CPC ................ *G06F 3/017* (2013.01); *A63F 13/06* (2013.01); *G09B 5/02* (2013.01); *G09B 5/06* (2013.01); *G09B 19/00* (2013.01); *G09B 21/00* (2013.01); *G09B 21/009* (2013.01); *A63F 2300/1087* (2013.01); *A63F 2300/6045* (2013.01); *A63F 2300/8011* (2013.01)

(58) Field of Classification Search
CPC ....................................................... G06F 3/033
USPC ......... 715/863, 860, 848, 835, 830, 788, 762, 715/738, 234, 202; 382/103; 345/650, 473, 345/440, 173, 158, 156
See application file for complete search history.

(56) References Cited

U.S. PATENT DOCUMENTS

| | | |
|---|---|---|
| 4,627,620 A | 12/1986 | Yang |
| 4,630,910 A | 12/1986 | Ross et al. |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

PCT Application No. PCT/US2010/057260, International Search Report dated Jul. 26, 2011.

(Continued)

*Primary Examiner* — Doon Chow
*Assistant Examiner* — David Choi
(74) *Attorney, Agent, or Firm* — Steve Wight; Judy Yee; Micky Minhas

(57) ABSTRACT

Techniques for managing a presentation of information in a gesture-based system, where gestures are derived from a user's body position or motion in the physical space, may enable a user to use gestures to control the manner in which the information is presented or to otherwise interact with the gesture-based system. A user may present information to an audience to an audience using gestures that control aspects of the system, or multiple users may work together using gestures to control aspects of the system. Thus, in an example embodiment, a single user can control the presentation of information to the audience via gestures. In another example embodiment, multiple participants can share control of the presentation via gestures captured by a capture device or otherwise interact with the system to control aspects of the presentation.

20 Claims, 12 Drawing Sheets

(51) Int. Cl.
*G09B 5/06* (2006.01)
*G09B 19/00* (2006.01)
*G09B 21/00* (2006.01)

(56) References Cited

U.S. PATENT DOCUMENTS

| | | | |
|---|---|---|---|
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |
| 5,101,444 A | 3/1992 | Wilson et al. | |
| 5,148,154 A | 9/1992 | MacKay et al. | |
| 5,184,295 A | 2/1993 | Mann | |
| 5,229,754 A | 7/1993 | Aoki et al. | |
| 5,229,756 A | 7/1993 | Kosugi et al. | |
| 5,239,463 A | 8/1993 | Blair et al. | |
| 5,239,464 A | 8/1993 | Blair et al. | |
| 5,288,078 A | 2/1994 | Capper et al. | |
| 5,295,491 A | 3/1994 | Gevins | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,417,210 A | 5/1995 | Funda et al. | |
| 5,423,554 A | 6/1995 | Davis | |
| 5,454,043 A | 9/1995 | Freeman | |
| 5,469,740 A | 11/1995 | French et al. | |
| 5,473,745 A * | 12/1995 | Berry et al. | 715/788 |
| 5,495,576 A | 2/1996 | Ritchey | |
| 5,516,105 A | 5/1996 | Eisenbrey et al. | |
| 5,524,637 A | 6/1996 | Erickson et al. | |
| 5,534,917 A | 7/1996 | MacDougall | |
| 5,557,725 A * | 9/1996 | Ansberry et al. | 715/755 |
| 5,563,988 A | 10/1996 | Maes et al. | |
| 5,577,981 A | 11/1996 | Jarvik | |
| 5,580,249 A | 12/1996 | Jacobsen et al. | |
| 5,586,244 A * | 12/1996 | Berry et al. | 715/788 |
| 5,594,469 A | 1/1997 | Freeman et al. | |
| 5,597,309 A | 1/1997 | Riess | |
| 5,600,765 A | 2/1997 | Ando | |
| 5,616,078 A | 4/1997 | Oh | |
| 5,617,312 A | 4/1997 | Iura et al. | |
| 5,638,300 A | 6/1997 | Johnson | |
| 5,641,288 A | 6/1997 | Zaenglein | |
| 5,682,196 A | 10/1997 | Freeman | |
| 5,682,229 A | 10/1997 | Wangler | |
| 5,690,582 A | 11/1997 | Ulrich et al. | |
| 5,703,367 A | 12/1997 | Hashimoto et al. | |
| 5,704,837 A | 1/1998 | Iwasaki et al. | |
| 5,715,834 A | 2/1998 | Bergamasco et al. | |
| 5,802,381 A * | 9/1998 | Matsumoto et al. | 715/202 |
| 5,875,108 A | 2/1999 | Hoffberg et al. | |
| 5,877,803 A | 3/1999 | Wee et al. | |
| 5,913,727 A | 6/1999 | Ahdoot | |
| 5,933,125 A | 8/1999 | Fernie | |
| 5,980,256 A | 11/1999 | Carmein | |
| 5,989,157 A | 11/1999 | Walton | |
| 5,995,649 A | 11/1999 | Marugame | |
| 6,005,548 A | 12/1999 | Latypov et al. | |
| 6,009,210 A | 12/1999 | Kang | |
| 6,046,750 A * | 4/2000 | Fitzpatrick et al. | 345/440 |
| 6,054,991 A | 4/2000 | Crane et al. | |
| 6,061,050 A * | 5/2000 | Allport et al. | 345/173 |
| 6,066,075 A | 5/2000 | Poulton | |
| 6,069,637 A * | 5/2000 | Gaglione et al. | 345/629 |
| 6,072,494 A | 6/2000 | Nguyen | |
| 6,073,489 A | 6/2000 | French et al. | |
| 6,077,201 A | 6/2000 | Cheng et al. | |
| 6,098,458 A | 8/2000 | French et al. | |
| 6,100,896 A | 8/2000 | Strohecker et al. | |
| 6,101,289 A | 8/2000 | Kellner | |
| 6,128,003 A | 10/2000 | Smith et al. | |
| 6,130,677 A | 10/2000 | Kunz | |
| 6,141,463 A | 10/2000 | Covell et al. | |
| 6,147,678 A | 11/2000 | Kumar et al. | |
| 6,152,856 A | 11/2000 | Studor et al. | |
| 6,159,100 A | 12/2000 | Smith | |
| 6,173,066 B1 | 1/2001 | Peurach et al. | |
| 6,181,343 B1 | 1/2001 | Lyons | |
| 6,188,777 B1 | 2/2001 | Darrell et al. | |
| 6,215,890 B1 | 4/2001 | Matsuo et al. | |
| 6,215,898 B1 | 4/2001 | Woodfill et al. | |
| 6,226,396 B1 | 5/2001 | Marugame | |
| 6,229,913 B1 | 5/2001 | Nayar et al. | |
| 6,249,292 B1 * | 6/2001 | Christian et al. | 345/473 |
| 6,256,033 B1 | 7/2001 | Nguyen | |
| 6,256,046 B1 | 7/2001 | Waters et al. | |
| 6,256,400 B1 | 7/2001 | Takata et al. | |
| 6,283,860 B1 | 9/2001 | Lyons et al. | |
| 6,289,112 B1 | 9/2001 | Jain et al. | |
| 6,299,308 B1 | 10/2001 | Voronka et al. | |
| 6,308,565 B1 | 10/2001 | French et al. | |
| 6,316,934 B1 | 11/2001 | Amorai-Moriya et al. | |
| 6,326,962 B1 * | 12/2001 | Szabo | 715/762 |
| 6,346,933 B1 | 2/2002 | Lin | |
| 6,363,160 B1 | 3/2002 | Bradski et al. | |
| 6,384,819 B1 | 5/2002 | Hunter | |
| 6,384,829 B1 * | 5/2002 | Prevost et al. | 345/473 |
| 6,411,744 B1 | 6/2002 | Edwards | |
| 6,430,997 B1 | 8/2002 | French et al. | |
| 6,476,834 B1 | 11/2002 | Doval et al. | |
| 6,496,598 B1 | 12/2002 | Harman | |
| 6,503,195 B1 | 1/2003 | Keller et al. | |
| 6,539,931 B2 | 4/2003 | Trajkovic et al. | |
| 6,570,555 B1 | 5/2003 | Prevost et al. | |
| 6,633,294 B1 | 10/2003 | Rosenthal et al. | |
| 6,640,202 B1 | 10/2003 | Dietz et al. | |
| 6,661,918 B1 | 12/2003 | Gordon et al. | |
| 6,681,031 B2 | 1/2004 | Cohen et al. | |
| 6,714,665 B1 | 3/2004 | Hanna et al. | |
| 6,731,799 B1 | 5/2004 | Sun et al. | |
| 6,738,066 B1 | 5/2004 | Nguyen | |
| 6,765,726 B2 | 7/2004 | French et al. | |
| 6,788,809 B1 | 9/2004 | Grzeszczuk et al. | |
| 6,793,580 B2 * | 9/2004 | Sinclair et al. | 463/39 |
| 6,801,637 B2 | 10/2004 | Voronka et al. | |
| 6,873,723 B1 | 3/2005 | Aucsmith et al. | |
| 6,876,496 B2 | 4/2005 | French et al. | |
| 6,937,742 B2 | 8/2005 | Roberts et al. | |
| 6,950,534 B2 | 9/2005 | Cohen et al. | |
| 7,003,134 B1 | 2/2006 | Covell et al. | |
| 7,028,269 B1 | 4/2006 | Cohen-Solal | |
| 7,036,094 B1 | 4/2006 | Cohen et al. | |
| 7,038,855 B2 | 5/2006 | French et al. | |
| 7,039,676 B1 | 5/2006 | Day et al. | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,060,957 B2 | 6/2006 | Lange et al. | |
| 7,113,918 B1 | 9/2006 | Ahmad et al. | |
| 7,121,946 B2 | 10/2006 | Paul et al. | |
| 7,170,492 B2 | 1/2007 | Bell | |
| 7,181,518 B1 * | 2/2007 | Matsumoto et al. | 709/224 |
| 7,184,048 B2 | 2/2007 | Hunter | |
| 7,202,898 B1 | 4/2007 | Braun et al. | |
| 7,222,078 B2 | 5/2007 | Abelow | |
| 7,227,526 B2 | 6/2007 | Hildreth et al. | |
| 7,259,747 B2 | 8/2007 | Bell | |
| 7,308,112 B2 | 12/2007 | Fujimura et al. | |
| 7,317,836 B2 | 1/2008 | Fujimura et al. | |
| 7,348,963 B2 | 3/2008 | Bell | |
| 7,359,121 B2 | 4/2008 | French et al. | |
| 7,367,887 B2 | 5/2008 | Watabe et al. | |
| 7,379,563 B2 | 5/2008 | Shamaie | |
| 7,379,566 B2 | 5/2008 | Hildreth | |
| 7,389,591 B2 | 6/2008 | Jaiswal et al. | |

(56) References Cited

U.S. PATENT DOCUMENTS

| | | |
|---|---|---|
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,468,742 B2 | 12/2008 | Ahn |
| 7,489,812 B2 | 2/2009 | Fox et al. |
| 7,512,883 B2 | 3/2009 | Wallick |
| 7,536,032 B2 | 5/2009 | Bell |
| 7,552,403 B2 | 6/2009 | Wilson |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,665,041 B2 * | 2/2010 | Wilson et al. ............... 715/860 |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 7,957,565 B1 * | 6/2011 | Sharma et al. ............... 382/115 |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 2003/0046316 A1 * | 3/2003 | Gergic et al. ............... 707/513 |
| 2003/0156134 A1 * | 8/2003 | Kim ............... 345/753 |
| 2004/0128350 A1 * | 7/2004 | Topfl et al. ............... 709/204 |
| 2004/0189720 A1 * | 9/2004 | Wilson et al. ............... 345/863 |
| 2004/0193413 A1 * | 9/2004 | Wilson et al. ............... 704/243 |
| 2005/0261980 A1 | 11/2005 | Hadi |
| 2006/0009702 A1 * | 1/2006 | Iwaki et al. ............... 600/520 |
| 2007/0011273 A1 * | 1/2007 | Greenstein et al. ............... 709/217 |
| 2007/0080967 A1 * | 4/2007 | Miller ............... 345/473 |
| 2007/0113181 A1 * | 5/2007 | Blattner et al. ............... 715/706 |
| 2007/0124372 A1 | 5/2007 | Liu |
| 2007/0176921 A1 * | 8/2007 | Iwasaki et al. ............... 345/419 |
| 2008/0026838 A1 | 1/2008 | Dunstan et al. |
| 2008/0180519 A1 | 7/2008 | Cok |
| 2008/0215974 A1 * | 9/2008 | Harrison et al. ............... 715/706 |
| 2009/0049388 A1 * | 2/2009 | Taib et al. ............... 715/738 |
| 2009/0079813 A1 | 3/2009 | Hildreth |
| 2009/0158220 A1 | 6/2009 | Zalewski |
| 2009/0216639 A1 * | 8/2009 | Kapczynski et al. ............... 705/14 |
| 2009/0221374 A1 * | 9/2009 | Yen et al. ............... 463/42 |
| 2009/0228825 A1 * | 9/2009 | Van Os et al. ............... 715/780 |
| 2009/0295713 A1 * | 12/2009 | Piot et al. ............... 345/156 |
| 2009/0307601 A1 * | 12/2009 | Kumhyr et al. ............... 715/741 |
| 2009/0307611 A1 * | 12/2009 | Riley ............... 715/757 |
| 2009/0327977 A1 * | 12/2009 | Bachfischer et al. ............... 715/863 |
| 2010/0103131 A1 * | 4/2010 | Segal et al. ............... 345/173 |
| 2010/0138798 A1 * | 6/2010 | Wilson et al. ............... 715/863 |
| 2010/0146455 A1 * | 6/2010 | Wilson et al. ............... 715/860 |
| 2010/0146464 A1 * | 6/2010 | Wilson et al. ............... 715/863 |
| 2010/0287510 A1 * | 11/2010 | Cragun ............... 715/848 |
| 2010/0289743 A1 * | 11/2010 | Sun et al. ............... 345/158 |
| 2010/0333037 A1 * | 12/2010 | Pavlovski et al. ............... 715/848 |
| 2011/0029893 A1 * | 2/2011 | Roberts et al. ............... 715/753 |
| 2011/0041096 A1 * | 2/2011 | Larco et al. ............... 715/835 |
| 2011/0061025 A1 * | 3/2011 | Walline et al. ............... 715/830 |
| 2011/0115820 A1 * | 5/2011 | Kasahara et al. ............... 345/650 |
| 2011/0154266 A1 * | 6/2011 | Friend et al. ............... 715/863 |
| 2011/0234481 A1 * | 9/2011 | Katz et al. ............... 345/156 |

FOREIGN PATENT DOCUMENTS

| | | |
|---|---|---|
| JP | 08044490 A1 | 2/1996 |
| JP | 2000105748 A | 4/2000 |
| JP | 2003067074 A | 3/2003 |
| JP | 2007243253 A | 9/2007 |
| JP | 2008282092 A | 11/2008 |
| JP | 2009093614 A | 4/2009 |
| JP | 2009100789 A | 5/2009 |
| JP | 2009231949 A | 10/2009 |
| WO | 93/10708 A1 | 6/1993 |
| WO | 97/17598 A1 | 5/1997 |
| WO | 99/44698 A1 | 9/1999 |
| WO | WO0146941 A1 | 6/2001 |
| WO | WO 2009/042579 A1 | 4/2009 |

OTHER PUBLICATIONS

Hand gesture commands for slide view control in a PC based presentation—Published Date: Dec. 17, 1998 http://140.134.132.124/dspace/bitstream/2377/1679/1/ce07ics001998000021.pdf.

A "Presentation Manager" Developed with the Communications-Oriented Programming and Routing Environment: CORE—Published Date: Jun. 2001 http://org.csail.mit.edu/6.964/course-core-overview.pdf.

Simulating a Smartboard by Real-Time Gesture Detection in Lecture Videos—Published Date: Aug. 2008 http://ieeexplore.ieee.org/stamp/stamp.jsp?arnumber=04540197.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

(56) References Cited

OTHER PUBLICATIONS

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

Matsumoto; "Evaluation of an expression for the avatar on desktop virtual reality"; Journal of Information Processing Society of Japan; vol. 99 No. 88; Oct. 1999; p. 13-18; contains abstract.

\* cited by examiner

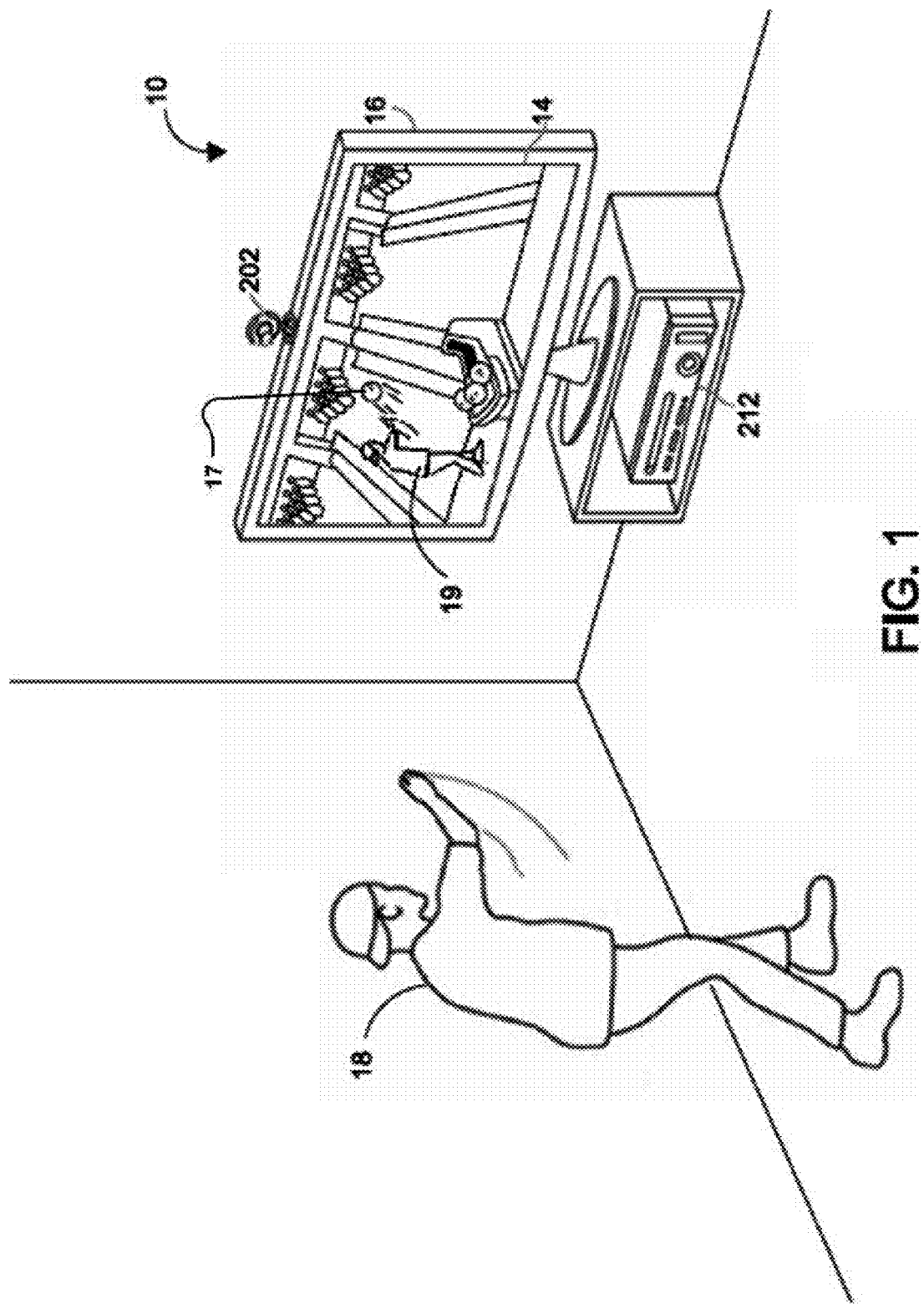

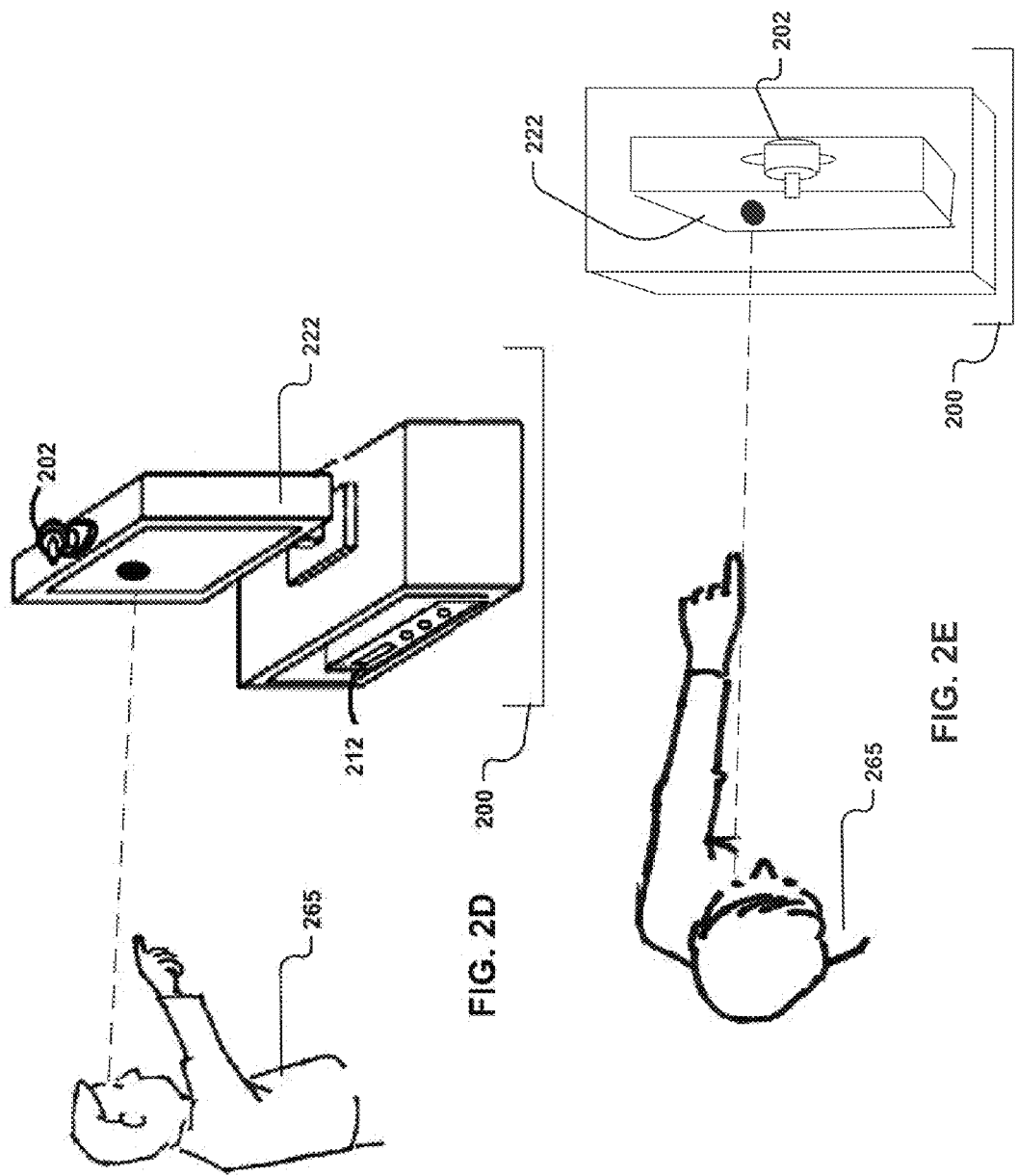

CAMERA NAVIGATION FOR PRESENTATIONS

BACKGROUND

Many computing applications such as computer games, multimedia applications, office applications or the like use controls to allow users to manipulate game characters or other aspects of an application. Typically such controls are input using, for example, controllers, remotes, keyboards, mice, or the like. For example, presentation management typically involves a user interacting with a controller/clicker and/or directly interacting with a computing device that is presenting. These methods of control have a variety of shortcomings For example, such controls can be difficult to learn, thus creating a barrier between a user and such games and applications. Controllers typically have a limited number of buttons, so limited navigation is available and the types of commands may vary extensively between the different types and abilities of the clickers. Using a controller while presenting can be distracting to the viewers. And, to share control of a presentation between multiple users, the users must each have access to the controller and/or hand the controller around.

SUMMARY

Disclosed herein are techniques for managing a presentation of information in a gesture-based system, where gestures are derived from a user's body position or motion in the physical space. A user may use the gestures to control the manner in which the information is presented or to otherwise interact with the gesture-based system. For example a capture device may capture data representative of a user's gestures, and gesture recognition techniques may be employed to recognize gestures applicable to control aspects of a gesture-based system. The presenter of the information may be incorporated into the presentation via an avatar or other visual representation. Thus, the user is immersed into the system in the form of a visual representation that can interact with the presentation of information. The audience to the presentation may similarly be immersed into the system. Thus, the immersion of the users of the system, including both presenters and observers, provides a virtual relationship between users that is more interactive than a simple display of the information.

A user may present information to an audience to an audience using gestures that control aspects of the system, or multiple users may work together using gestures to share the control of the system. Thus, in an example embodiment, a single user can control the presentation of information to the audience via gestures. In another example embodiment, multiple participants can share control of the presentation via gestures captured by a capture device or otherwise interact with the system to control aspects of the presentation. Gestures may be applicable for a variety of presentation formats. In an example embodiment, the gestures control aspects of a presentation application that comprises a non-sequential format of information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIG. 1 illustrates an example embodiment of a target recognition, analysis, and tracking system with a user playing a game.

FIGS. 2D and 2E depict an example target recognition, analysis, and tracking system from a side view and a top view, respectively, and an example embodiment of a user interacting via point and focus functionality.

DETAILED DESCRIPTION OF ILLUSTRATIVE EMBODIMENTS

Figure 2A:
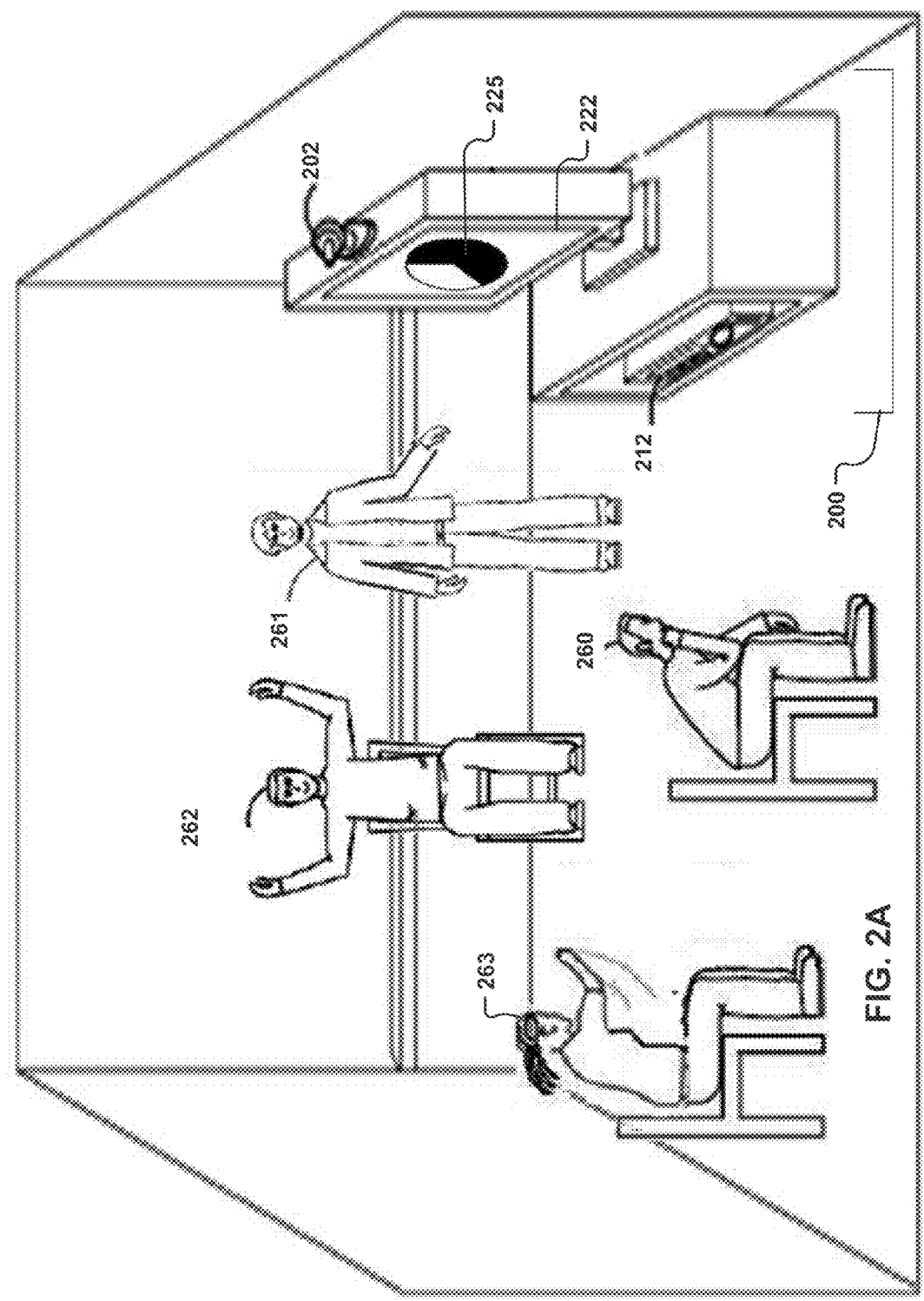
FIGS. 2A and 2B each illustrate an example embodiment of a shared presentation experience.

Disclosed herein are techniques for managing the presentation of information to an audience via gestures. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

A gesture may be derived from a user's position or motion in the physical space and may include any user motion, dynamic or static, such as running, moving a finger, or a static pose. According to an example embodiment, a capture device, such as a camera, may capture user image data include data that represents the user's gesture(s). A computer environment may be used to recognize and analyze the gestures made by the user in the user's three-dimensional physical space such that the user's gestures may be interpreted to control aspects of a system or application space. The computer environment may display user feedback by mapping the user's gesture(s) to an avatar on a screen.

A gesture based system may employ techniques for managing or controlling a presentation of information using gestures. A user may use the gestures to control the manner in which the information is presented or to otherwise interact with the gesture-based system. In an example embodiment, a single user can control the presentation of information to the audience via gestures. In another example embodiment, multiple participants can share control of the presentation via gestures captured by a capture device or otherwise interact with the system to control aspects of the presentation.

The system, methods, techniques, and components of presentation management may be embodied in a multi-media console, such as a gaming console, or in any other computing environment in which it is desired to display a visual representation of a target, including, by way of example and without any intended limitation, satellite receivers, set top boxes, arcade games, personal computers (PCs), portable telephones, personal digital assistants (PDAs), and other handheld devices.

FIG. 1 illustrates an example embodiment of a configuration of a target recognition, analysis, and tracking system 10 that may employ the disclosed techniques for immersing users into a gesture-based system enabling interaction via gestures. In the example embodiment, a user 18 is playing a bowling game. In an example embodiment, the system 10 may recognize, analyze, and/or track a human target such as the user 18. The system 10 may gather information related to the user's motions, facial expressions, body language, emotions, etc, in the physical space. For example, the system may identify and scan the human target 18. The system 10 may use body posture recognition techniques to identify the body type of the human target 18. The system 10 may identify the body parts of the user 18 and how they move.

As shown in FIG. 1, the target recognition, analysis, and tracking system 10 may include a computing environment 212. The computing environment 212 may be a multimedia console, a personal computer (PC), a gaming system or console, a handheld computing device, a PDA, a mobile phone, a cloud computer, a capture device, or the like. According to an example embodiment, the computing environment 212 may include hardware components and/or software components such that the computing environment 212 may be used to execute applications. An application may be any program that operates or is executed by the computing environment including both gaming and non-gaming applications, such as a word processor, spreadsheet, media player, database application, computer game, video game, chat, forum, community, instant messaging, or the like.

As shown in FIG. 1, the target recognition, analysis, and tracking system 10 may include a capture device 202. The capture device 202 may be, for example, a camera that may be used to visually monitor one or more users, such as the user 18, such that gestures performed by the one or more users may be captured, analyzed, and tracked to perform one or more controls or actions within an application. In the example embodiment shown in FIG. 1, a virtual object is a bowling ball and the user moves in the three-dimensional physical space as if actually handling a bowling ball. The user's gestures in the physical space can control the bowling ball 17 displayed on the screen 14. In example embodiments, the human target such as the user 18 may actually have a physical object. In such embodiments, the user of the gesture-based system may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game.

According to one embodiment, the target recognition, analysis, and tracking system 10 may be connected to an audiovisual device 16 such as a television, a monitor, a high-definition television (HDTV), or the like that may provide game or application visuals and/or audio to a user such as the user 18. For example, the computing environment 212 may include a video adapter such as a graphics card and/or an audio adapter such as a sound card that may provide audiovisual signals associated with the game application, non-game application, or the like. The audiovisual device 16 may receive the audiovisual signals from the computing environment 212 and may then output the game or application visuals and/or audio associated with the audiovisual signals to the user 18. According to one embodiment, the audiovisual device 16 may be connected to the computing environment 212 via, for example, an S-Video cable, a coaxial cable, an HDMI cable, a DVI cable, a VGA cable, or the like.

As used herein, a computing environment may refer to a single computing device or to a computing system. The computing environment may include non-computing components. As used herein, a computing system, computing device, computing environment, computer, processor, or other computing component may be used interchangeably. For example, the computing environment may comprise the entire target recognition, analysis, and tracking system 10 shown in FIG. 1. The computing environment may include the audiovisual device 16 and/or the capture device 202. Either or both of the exemplary audiovisual device 16 or capture device 202 may be an entity separate but coupled to the computing environment or may be part of the computing device that processes and displays, for example. Thus, a computing environment may be a standalone capture device comprising a processor that can process the captured data. Thus, capture device 202 may be equipped to not only process the captured data, but analyze and store data, output the data to a screen, etc.

As shown in FIG. 1, the target recognition, analysis, and tracking system 10 may be used to recognize, analyze, and/or track a human target such as the user 18. For example, the user 18 may be tracked using the capture device 202 such that the gestures of user 18 may be interpreted as controls that may be used to affect the application being executed by computer environment 212. Thus, according to one embodiment, the user 18 may move his or her body to control the application. The system 10 may track the user's body and the motions made by the user's body, including gestures that control aspects of the system, such as the application, operating system, or the like.

The system 10 may translate an input to a capture device 202 into an animation, the input being representative of a user's motion, such that the animation is driven by that input. Thus, the user's motions may map to a visual representation, such as an avatar, such that the user's motions in the physical space are emulated by the avatar. The rate that frames of image data are captured and displayed may determine the level of continuity of the displayed motion of the visual representation.

FIG. 1 depicts an example embodiment of an application executing on the computing environment 212 that may be a bowling game that the user 18 may be playing. In this example, the computing environment 212 may use the audiovisual device 16 to provide a visual representation of a bowling alley and bowling lanes to the user 18. The computing environment 212 may also use the audiovisual device 16 to provide a visual representation of a player avatar 19 that the user 18 may control with his or her movements. The computer environment 212 and the capture device 202 of the target recognition, analysis, and tracking system 10 may be used to recognize and analyze the gestures made by the user 18 in the user's three-dimensional physical space such that the user's gestures may be interpreted to control the player avatar 19 in game space. For example, as shown in FIG. 1, the user 18 may make a bowling motion in a physical space to cause the player avatar 19 to make a bowling motion in the game space. Other movements by the user 18 may also be interpreted as controls or actions, such as controls to walk, select a ball, position the avatar on the bowling lane, swing the ball, etc.

Multiple users can interact with each other from remote locations. The computing environment 212 may use the audiovisual device 16 to provide the visual representation of a player avatar that another user may control with his or her movements. For example, the visual representation of another bowler on the audiovisual device 16 may be representative of another user, such as a second user in the physical space with the user, or a networked user in a second physical space. It may be beneficial for multiple users that are engaging with the system to each wear an immersive display or look through a display that captures a real world environment. For example, a user may be able to view a wide area of an environment or may be able to focus in on objects or events of interest within the environment by adjusting the personal immersive display. An example immersive display is a wearable head piece comprising a capture device and display component.

Gestures may be used in a video-game-specific context such as the bowling game example shown in FIG. 1. In another game example such as a driving game, various motions of the hands and feet may correspond to steering a vehicle in a direction, shifting gears, accelerating, and breaking. The player's gestures may be interpreted as controls that correspond to actions other than controlling the avatar 19, such as gestures used for input in a general computing context. For instance, various motions of the user's 18 hands or other body parts may to end, pause, or save a game, select a level, view high scores, communicate with a friend, etc.

While FIG. 1 depicts the user in a video-game-specific context, it is contemplated that the target recognition, analysis, and tracking system 10 may interpret target movements for controlling aspects of an operating system and/or application that are outside the realm of games. Virtually any controllable aspect of an operating system and/or application may be controlled by movements of the target such as the user 18. For example, the user's gestures may correspond to common system wide tasks such as navigate up or down in a hierarchical list, open a file, close a file, and save a file. The user's gesture may be controls applicable to an operating system, non-gaming aspects of a game, or a non-gaming application. For example, the user's gestures may be interpreted as object manipulation, such as controlling a user interface. For example, consider a user interface having blades or a tabbed interface lined up vertically left to right, where the selection of each blade or tab opens up the options for various controls within the application or the system. The system may identify the user's hand gesture for movement of a tab, where the user's hand in the physical space is virtually aligned with a tab in the application space. The gesture, including a pause, a grabbing motion, and then a sweep of the hand to the left, may be interpreted as the selection of a tab, and then moving it out of the way to open the next tab.

Figure 2B:
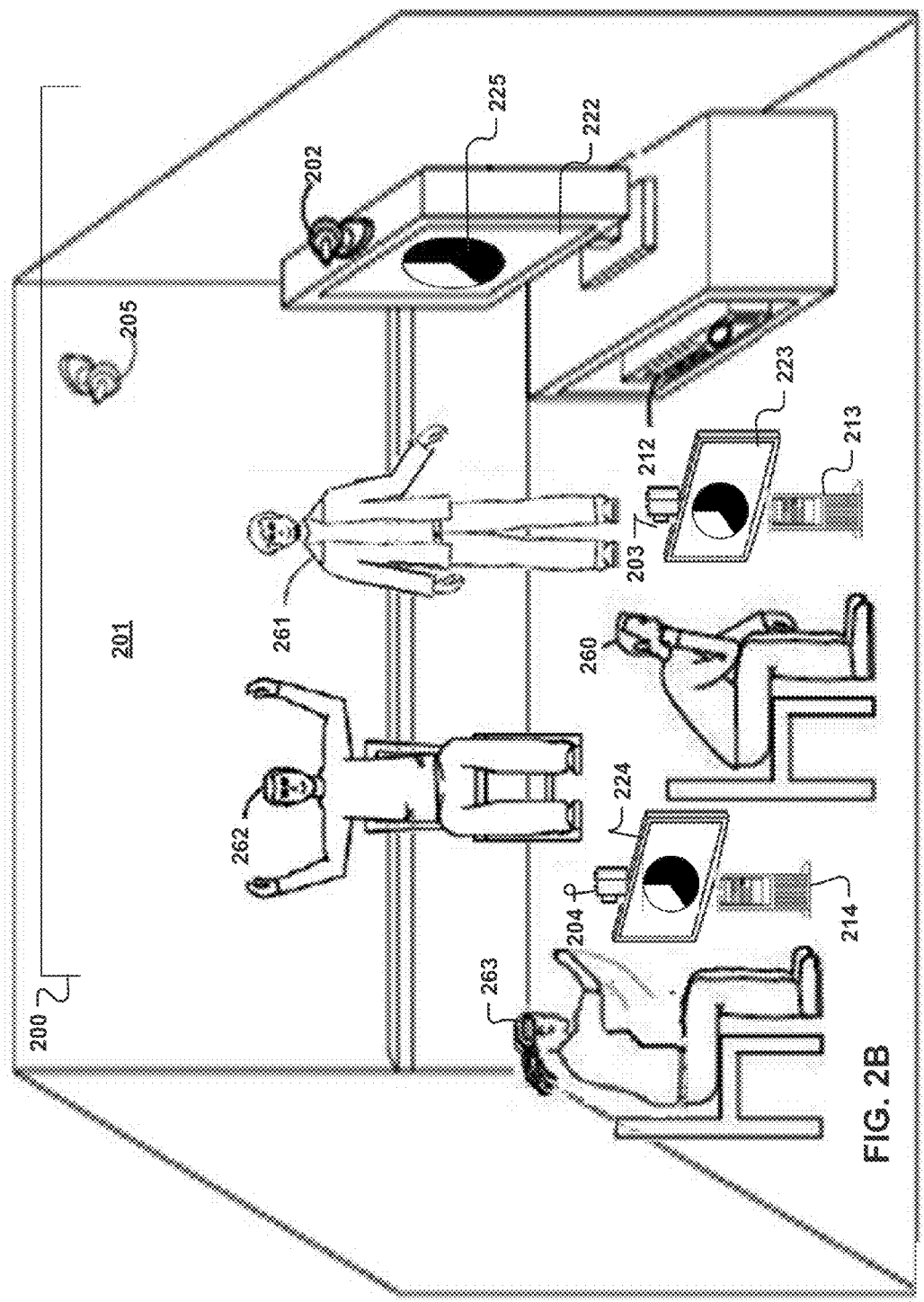

FIGS. 2A and 2B illustrate example embodiments for a gesture-based system 200 that may capture a user, or multiple users as shown, in a physical space 201. The system 200 may recognize gestures from the captured data that correspond to controls of the system 200. Users may use gestures to manage the presentation of information or multiple users may work together via gestures to collaborate with the information presented.

The system 200 may comprise any number of computing environments, capture devices, displays, or any combination thereof The system 200 shown in FIG. 2A comprises a capture device 202, a computing environment 212, and a display device 222. The system 200 shown in FIG. 2B represents a gesture-base system 200 with multiple computing environments 212, 213, 214, capture devices 202, 203, 204, and displays 222, 223, 224. A computing environment may be a multimedia console, a personal computer (PC), a gaming system or console, a handheld computing device, a PDA, a mobile phone, a cloud computer, or the like, and may include or otherwise connect to a capture device or display. The capture device, computing device, and display device may comprise any suitable device that performs the desired functionality, such as the devices described with respect to FIG. 1 above or FIGS. 3-8 described below.

Figure 3:
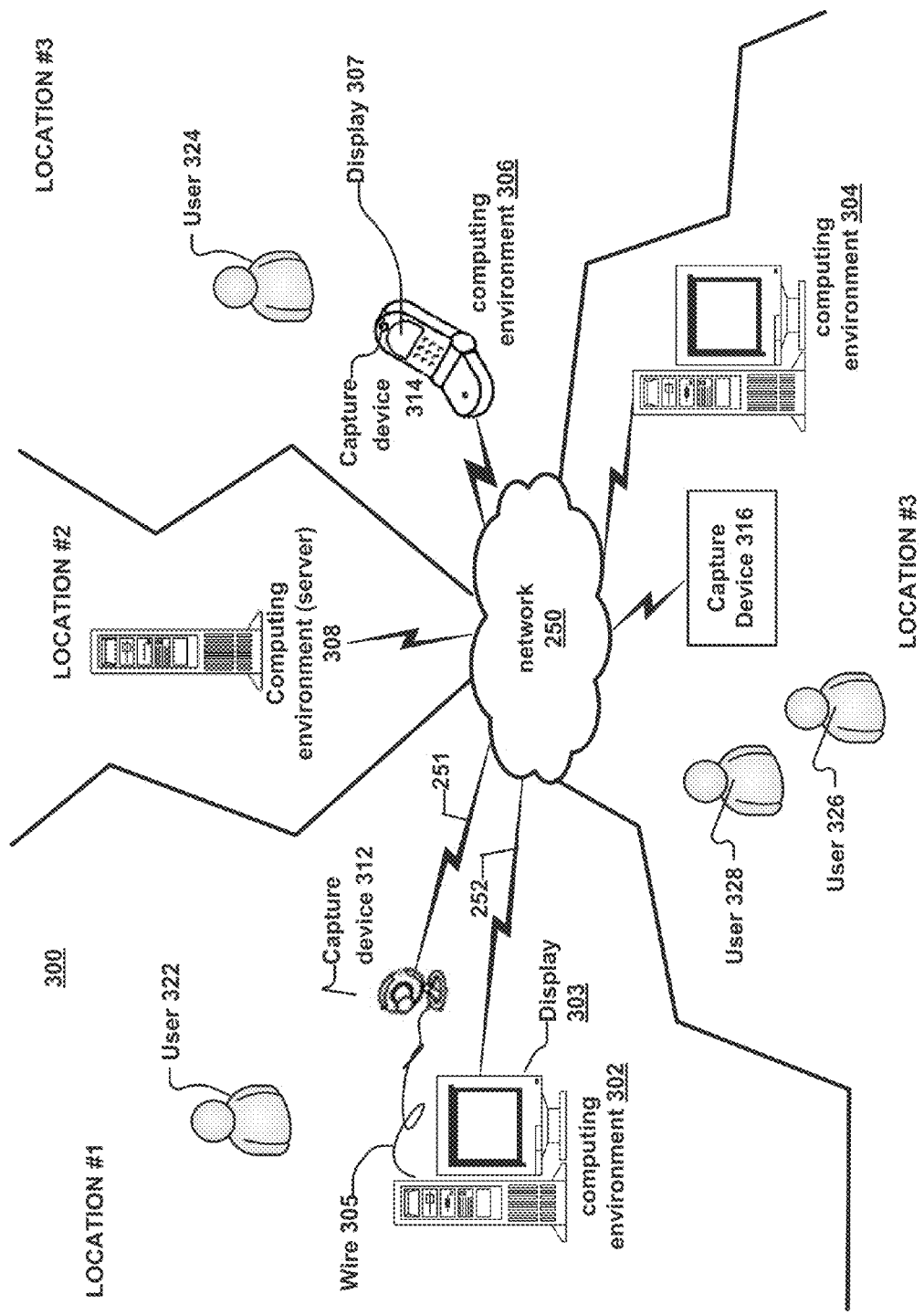
FIG. 3 is a diagram for shared control of a presentation over a network.

Both of FIGS. 2A and 2B depict an example of a productivity scenario for computer management that may involve multiple users in the physical space, such as users 260, 261, 262, 263, for example. For example, the physical space may be a conference room and the users 260, 261, 262, 263 may be in attendance for a meeting or to collaborate ideas. It is also contemplated that remote users may interact with the system 200 from a second location, such as in another room down the hall or from an even more remote location, such as from a user's home or office located in another state. FIG. 3, described below, depicts an example of a networked environment that allows both local and remote users to interact via a gesture-based system for computer management in such a scenario.

A productivity scenario in this context may be any form of the presentation of information that may be managed via a gesture based system 200, such as the example systems illustrated in FIGS. 2A and 2B. In an example scenario, the users 260, 261, 262, 263 may be in a meeting where the output of a presentation application is displayed to display 222. The presentation of information may comprise animation, graphics, text, or the like, and be presented in a word processing format, video and/or audio presentation, slide show, database application, media player, chart (e.g., flow chart, pie chart), chat, forum, community, instant messaging, or any other form of work product.

The capture device 202 may capture data representative of a user's gestures, such as the gestures of each of the users 260, 261, 262, 263. As shown in FIGS. 2A and 2B, the users can be at varying distances from the system 200 or from specific components in the system, and still have control over aspects of the system. The gestures may be recognized as controls of the presentation of information. The gestures may control a variety of aspects of the gesture-based system. The gestures may control anything display on a screen, such as adding words to a document, scrolling down, or paging through a document, spanning a column in a spreadsheet, pivoting or rotating a three-dimensional figure, zoom in or out, or the like. For example, consider that display 222 shows a virtual chalk board or dry erase board, the user's gestures may be recognized to draw or write letters to the screen, switch between slides in a slideshow, pause a slideshow, etc. The user may gesture to add a bullet to a word document.

The gestures may incorporate audio commands or audio commands may supplement the user's gestures. For example, the user may gesture to add a bullet to a document and then speak words that are then added to the document, following the bullet point. The system may recognize the combination of the gesture to add a bullet and the audio as a control to add the bullet and then write the spoken words to follow the bullet. Because the user may gesture to control the presentation, there is much flexibility for the user to move about the room.

The user is not limited to the use of a controller or having to push buttons directly on the computing environment. It is, however, contemplated that the use of gestures may be combined with the use of controllers/buttons to accommodate both types of control. Some gestures may use information input via a controller in addition to the user's gesture comprised of body motion, for example.

For exemplary purposes, a snapshot of an example presentation of information shown in FIG. 2A comprises a graph 225 displayed on the screen. Consider a scenario in which a user, such as user 261, is presenting information to other users 260, 262, 263 in the room and/or remote users (not shown). The gestures may replace or supplement the need for a controller or similar needs for managing the presentation. An aspect of the application that can be done via a mouse, or clicker, or laser, or microphone, or other peripheral device can be done via gestures. Gestures may control any aspect of the gesture-based system that may have previously required the user of a controller. For example, a gesture may control a virtual laser that displays a light on the screen. Rather than using a laser pointer to highlight something of interest by projecting a small bright spot of light on the display, the user may gesture with a finger. The movement of the user's finger may simulate the movement of a laser pointer, and the system may recognize the gesture and display a spot of light on the screen that corresponds to the finger movement; no controller is actually necessary. Gestures may also control aspects of a system that are different from or not otherwise available for control with a controller. For example, controlling a motion of a visual representation to correspond directly to the user's motion in the physical space is available via gestures, whereas the animation of a visual representation is not a direct translation of the user's gestures when a controller is required for input.

FIG. 2B illustrates another example embodiment for a system 200 that may capture a user in a physical space 201 and map captured data to a visual representation in a virtual environment. Similar to FIG. 2A, system 200 comprises a capture device 202, a computing environment 212, and a display device 222. However, in this example, the system 200 also includes additional computing environments, such as another capture device 205, and computing environments, 213, 214 associated with and positioned in close-range to users 260, 263, respectively, and capture devices 203 and 204 associated with computing environments 213, 214, respectively.

The various devices or components in a gesture-based system may handshake with each other via a network and communicate to share information. For example, the capture devices 202, 203, 204, 205 and each computing environment 212, 213, 214 may communicate over a wired or wireless connection, such as via a cable connection, a Wi-Fi connection, or a home wireless network, for example. The various capture devices 202, 203, 204, 205 may share the captured data with each other or a central computing environment may aggregate the data for processing and interpreting the data. For example, computing environment 212 may be the computing environment that stores and executes the presentation application that is visible to the plurality of users 260, 261, 262, 263 in the physical space. Computing environment 212 may receive captured data from other components in the system, such as directly from a capture device 204, for example, or from a computing environment 214, for example.

The display 222 may be a main display in the front of the room, selected for a size that is visible to most if not all of the users in the room. The display may be a headmounted display such as an immersive device. For example, a headmounted display may replace the user's field of view with an artificial visual environment. In another example, only a partial view of the user's field of view is replaced with an artificial environment. For example, the headmounted display may be capable of head tracking to overlay information on a display of the user's view. The display can adjust the displayed image depending on the direction in which the user's head is aimed. For example, if the users are viewing a map on a display, each user's headmounted display may comprise a zoomed in portion that represents where the user is looking. Alternately, the user may navigate through a presentation differently than that of other users in the room by interaction with his or her personal display. Thus, the realism of the virtual environment may make the simulated environment more engaging, where the user has a more realistic and personal interaction with the virtual reality.

The computing environment 212 attached to the main display 222 may aggregate data from capture devices 202, 203, 204, 205 and computing environments 213, 214 to analyze a compilation of captured data captured in the physical space. Gestures may be recognized from the aggregated data and result in a control of an aspect of they gesture-based system. An example network setup that provides for such communication between components in the gesture-based system is described in more detail below with respect to FIG. 3.

As reflected by the example shown in FIG. 2B, it is contemplated that multiple users 260, 261, 262, 263 may be interacting via the networked system components. The system enables the multiple components to combine their inputs for the gesture being applied. Thus, multiple users 260, 261, 262, 263 may control aspects of the system. For example, multiple capture devices with varying capabilities for capturing touch, depth, audio, video, etc, may capture data with respect to multiple users 260, 261, 262, 263 from the physical space. The captured data may be aggregated and processed to control aspects of the system on behalf of multiple users. This enables multiple users to interact with each other via gestures and via the system, enhancing the nature of collaboration in the productivity environment via gestures.

With respect to FIG. 2B, consider that users 260, 261, 262, and 263 are in a meeting and captured by capture device 205, where user 260 is associated with another capture device 203, and user 263 is associated with another capture device 204. The physical space may be a large space, such as a large conference room, for example and a user, such as user 263, may be seated far from the capture device 205. The user may be positioned closer to the capture device 204 in the physical space, however, and may also be viewing the shared presentation on a closer, smaller screen via, such as display 224 or a cellular device (not shown), for example. The computing environment 212 may execute the presentation application and output to multiple displays, such as display 222, 223, and 224.

Captured data from any of the capture devices may be analyzed for gesture recognition and, therefore, any of the users in the field of view of a networked capture device may control, via gestures, a presentation displayed on the main display 222. The user may control aspects of the shared presentation by gesturing with a second computing environment or capture device in the physical space. For example, the user may gesture on a small scale with respect to the computing environment 214 that is closer to the user 263. The small scale gesture may not be captured by capture device 205, for example, if other users or objects in the room, such as display 224, obstruct the capture device's field of view. The user's 263 gestures may be captured by the capture device 204 and processed by the local computing environment 214 or shared with computing environment 212, 213 via a network, for example. Any computing environment networked in the same gesture-based system may therefore process captured data from any number of capture devices also networked in the gesture-based system. The user's 263 gesture may be recognized as a control of the presentation that is shared between computing environments. Thus, a first user's gestures associated with a first capture device/computing environment may control aspects of a second computing environment.

The users 260, 263, for example may interact via gestures with the close range computing environment 213, 214, respectively, and the corresponding control may translate to other computing environments in the system, such as to the main computing environment 212 or other personal computing environments networked to the system. The user's gesture may control the other computing environments in the session and/or results of the gesture may be rendered or otherwise indicated on everyone else's display. For example, user 263 may gesture at close range with computing environment 214. The user's 263 gesture may contribute to managing the presentation displayed on the main display 222. The close range capture device 204 may capture data representative of the user's 263 gesture and the computing environment 214 may employ gesture recognition techniques to identify gestures from the capture data. The gesture may control specific aspects of the computing environment 214 associated with the user 263. The gestures may translate to a control of the main computing environment 212. Thus, users can gesture with respect to a close range device and/or capture device and have the same effects as if they were gesturing with respect to the main computing system.

The use of additional capture devices and/or computing environments may provide additional flexibility for control of the system 200. For example, consider a large conference room where a user is seated in the back of the room. In some instances, a capture device in the front of the room may not capture the user seated in the back of the room. For example, there may be obstructions of view between the user and capture device, the capture device may not register the user, or the capture device may not have the resolution to identify the user or identify a user's level of access, for example. The user can gesture with a second capture device in the physical space networked with the system, such as a capture device positioned closer to the user or a capture device associated with the user's personal computing environment. Thus, the gesture-based system can integrate multiple users into the system in a variety of ways to manage aspects of the presentation.

In an example embodiment, such as in the example scenarios shown in FIGS. 2A and 2B, there may be a single user or a primary user managing the presentation of information. The collaborative system enables and encourages audience participation via gestures such that an audience member can control aspects of the system. A single capture device, such as capture device 202 attached to the top of the display 222 or the capture device 205 hanging from the wall, or a combination of capture devices may capture data representative of multiple people in a physical space. Multiple people can gesture to control a single application, such as an application executing on computing environment 212. For example, if the application was a mapping program, and the users were working together to generate a travel plan, the various users could interact with the single mapping program to zoom in, pan around, etc. Because multiple users can provide input to control aspects of the application via gestures, multiple controllers do not have to be passed around the room. Additional users could join the room and they could also use gestures, without having to find an extra controller, for example.

The system can passively evaluate the captured data representative of multiple users and their gestures for other purposes besides control of the system. For example, a user's gestures may not be intentionally performed by the user to control an aspect of the system, but may still be identified for data collection purposes. Thus, gestures or information related to the gestures may be gathered and logged. Consider the multiple users 260, 261, 262, and 263 in the physical space. The system may pose a question on the display 222 or transmit the question audibly via a speaker system, for example. The question may be prompted by a user, such as user 261 that may be presenting information to the other users. The system may identify motions made by the multiple users, including those that correspond to gestures, in response to the question. The information may be gathered and provided in real-time to an output, such as a file stored in memory or a display.

For example, the system may poll the audience as a result of a question posed by a user or by the system. The question may be answered by a simple yes or no, or it may comprise a multitude of possible answers, and each answer may correspond to a gesture. For example, the question may be "How many people vote for option A", and a "yes" answer may be represented by a gesture comprising a user raising a hand straight up in the air. The system may detect, from the captured data, each user that is raising his or her hand and each user that is not. The system may therefore count the number of "yes" responses based on the gestures identified for each user. Thus, the system can provide instant poll results.

The gestures recognized by the system during the presentation may trigger a subsequent action by the system. For example, the system may recognize a handshake between two users, and the handshake may be recognized as a "introduction" gesture between two users in the room, where the "introduction" gesture comprises two people shaking hands. The system may identify each user, identify the "introduction" gesture, and automatically log contact information for each user in a log that is provided to each user at the end of the meeting. Thus, a user may have contact information for each person with whom the user shook hands, with access to a compiled list of contact information. Another example of information logged during a meeting may be an identification of a point in the display that is of interest to a user, where the logging of information may be triggered by a gesture. For example, during the meeting, a user may gesture to indicate that a particular screenshot or point in the presentation is of interest to the user, and the system may include identifying information in the log such that the user can easily find the information to review at a later point. The gesture may comprise a minor motion, such as a finger tap on the table, or a raised finger. Thus, without interruption to the flow of the presentation, the system may log data for each user based on each user's various gestures. Each user may then have access to a log of information that is specific to the user.

Other actions may be triggered upon the recognition of gestures by the system. For example, consider other common events that occur throughout a meeting, besides those discussed above, such as delegating responsibilities to meeting participants, dialing in remote users, indicating users that want copies of certain documents, or the like. A part of a meeting may comprise delegating responsibilities to various users. The system or a user may request or designate a volunteer, and a gesture recognized for the designation of the user may comprise the presenter pointing at the volunteer or the volunteer raising his or her hand. The system may recognize the gesture as an acceptance of an action item and associate the user with the action item, such as in an itemized list or in a spreadsheet. In another example, question may be presented to the users, such as "Do you want a copy of this document?" and, depending on the "yes" gestures in the room, the system may automatically generate an email, include an email address associated with each user that gestured "yes," and send the email to each user with the document attached. The action can occur in real-time, such that users may gain access to the documents while still in the meeting, or the action can be placed in a queue for action to be taken by the system at the conclusion of the meeting.

The actions may trigger an action by hardware components in the system. For example, if a user raises his or her hand, a first capture device may receive and process captured data and recognize the raised hand as a gesture indicating the user's desire to interact with the system. The first capture device may provide instructions to a second capture device to turn towards the user so that the user is in field view of the second capture device, or to better focus on the user. Another gesture may be an indication to save a portion of the presented information to memory, or to a user's local memory, such as a local memory in a personal computing device such as the computing environment 214 associated with user 263. The users gesture may be an indication to power on a light, lower a screen, power on a display device, etc.

The actions to be triggered as a result of gestures may be determined by a set of instructions that is represented in an abbreviated format, such as a macro, for example. Thus, actions that the system will take as a result of particular gestures may be defined ahead of time, such as prior to the start of the meeting. The system could have any number of macros that are implemented as a result of particular gestures, resulting in actions that may be seamless to the user, such as adding information to a log or providing results to the presenter, or they may be known to the user, such as upon receipt of an email with information requested via the user's gestures. The macros may be pre-packaged with a system or application or they may be defined by the user.

The system may also take action as a result of gestures in a dynamic fashion. For example, a user may use a combination of gestures and/or stated commands and request that users interested in an emailed receipt of a document to raise a hand in the air, and then state a command for emailing the selected users. The system may respond to the combination of commands and gestures and email the subject document to each user with a hand raised.

In another example, the system may collect data regarding user's behavior in the physical space. For example, it may be desirable for a presenter to have feedback regarding the effectiveness of his or her presentation methods. During a presentation, for example, the system may employ facial or body recognition techniques to recognize facial features/movements or body positions/movements for various users present in the physical space. A facial feature/movement, body position/movement, or a combination thereof may correspond to a gesture that indicates a particular expression or emotion of the user. The system can provide a presenter with the information to indicates the level of attention, alertness, or related behaviors for the members in the audience. The user can use this information to identify effective presentation methods used throughout the presentation. For example, if the system collects data on the users indicating that a percentage of users displayed bored or disinterested gestures, and correlates this to a time when the user was displaying a large amount of words on the display, the user may use this to indicate that displaying a large amount of words was not effective for the group. However, with a different audience, the words may be appropriate, such as when the words of a document are being evaluated by the members of the audience. In another example, the user may use animated and interactive techniques and the system may recognize excited or active user participation. Thus, the presenter can tailor a presentation to the users in the middle of the presentation, based on information provided to the user in real time, or in preparation for a meeting, based no previously gathered data.

The system may provide dynamic suggestions to a user during the presentation based on its detection of audience behaviors correlated to circumstances of the presentation. For example, during the presentation the system may identify bored gestures during text-heavy slides and suggest to the user to skip over a text-heavy slide. The system may identify that the user gets better audience participation when the user is moving around in the front of the room rather than sitting down off to the side. The system may provide the user with such information during the presentation or the system may monitor audience engagement over time and generate a report providing the results to the user.

Figure 2C:
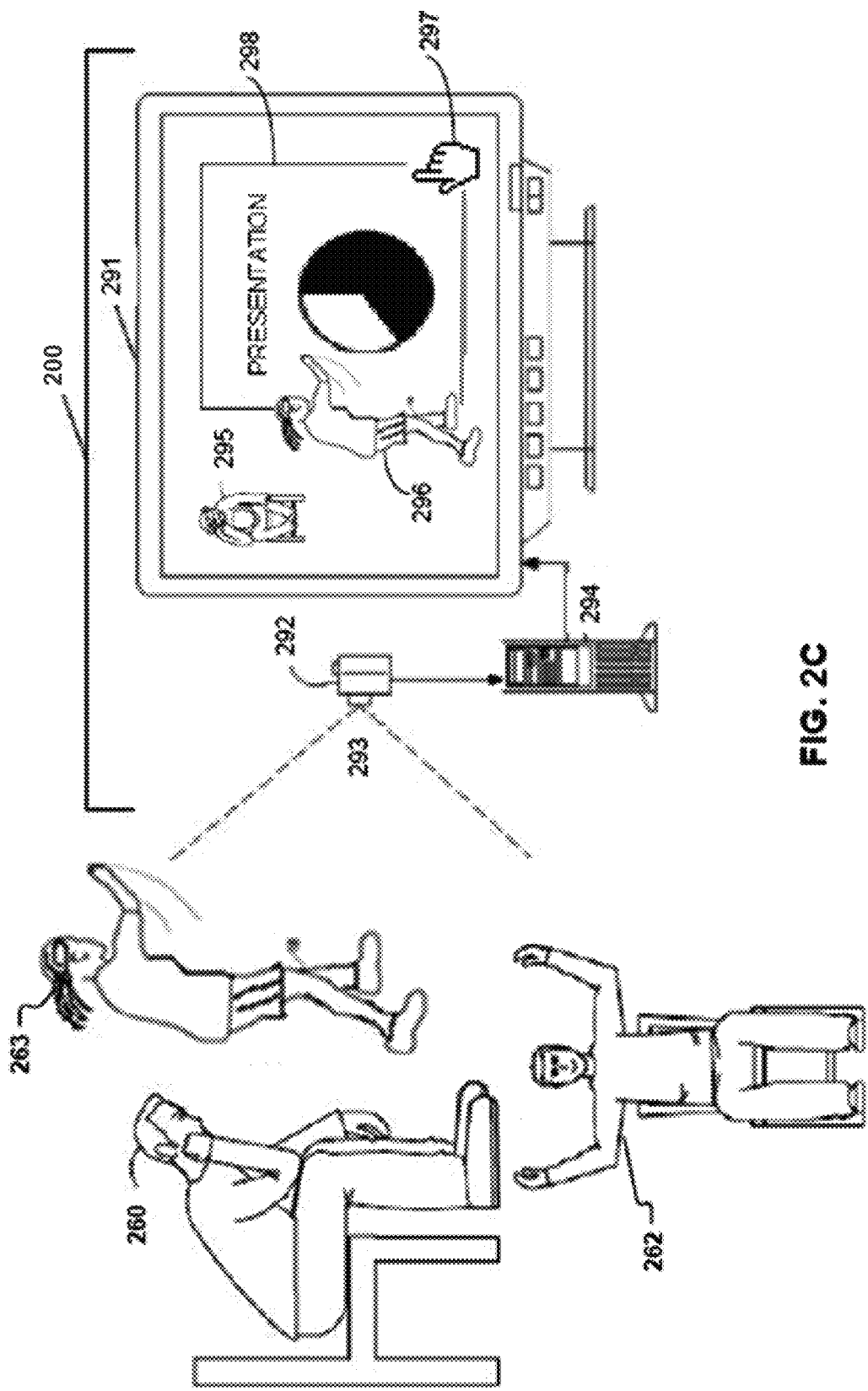
FIG. 2C depicts an example target recognition, analysis, and tracking system and an example embodiment of multiple users in the physical space and a display of each user's visual representation.

Each user participating, whether presenting information, interacting with the system via gestures, observing the presentation, or merely present in view of capture device, may be represented by a visual representation. FIG. 2C depicts another example gesture-based system 200 that may comprise a capture device 292, a computing device 294, and a display device 291. For example, the capture device 292, computing device 294, and display device 291 may each comprise any suitable device that performs the desired functionality, such as the devices described herein.

In this example, a depth camera 292 captures a scene in a physical space 293 in which a plurality of users 260, 262, 263 are present. The depth camera 292 processes the depth information and/or provides the depth information to a computer, such as computer 294. The depth information can be interpreted for display of a visual representation of the users 260, 262, 263. For example, the depth camera 292 or, as shown, a computing device 294 to which it is coupled, may output to a display 291.

The visual representation is a computer representation that typically takes the form of a two-dimensional (2D) or three-dimensional (3D) model. The visual representation of a user in the physical space 293 can take any form, such as an animation, a character, an avatar, or the like. For example, the visual representation may be an avatar, such as the avatars 295 or 296 shown in FIG. 2C that represents the users 260 and 263, respectively. The visual representation may be a cursor, arrow, or other symbol, such as the hand symbol 297, which represents user 262. In this example, a monkey character 295 represents user 260 and displays a body position that similar to that of the user 260 as captured by a capture device 292. The avatar 296 representing user 263 has physical characteristics that are similar to the user 263, even the user's 263 clothes are analyzed by the capture device and applied to the user's visual representation 296.

The introduction of visual representations into the shared presentation experience may add another dimension to the experience by giving users a sense of identity within the virtual space. The user's visual representation may be rendered on a display, and the avatars of other users in the session may be rendered on everyone else's display, resulting in a group of avatars in the same virtual space even though the users may be in distinct physical spaces. The avatars of every person in the session may each be rendered on everyone else's television or monitor, resulting in a group of avatars that appear to be interacting in a virtual environment. Because users in a session may include both remote and local users, the display may render visual representations for both the remote and local users such that all of the users can identify other participants based on the presence of each visual representation.

Each user may be represented by their own customized visual representation, such as a customized avatar or character. The visual representation of a user may reflect the characteristics of the user as captured by the capture device. For example, the capture device may employ body/facial recognition techniques and transform the captured data into a visual representation that resembles the user. Thus, the onscreen avatar may look and act like the user. The visual representation of a user detected in the physical space 293 can also take alternate forms, such as an animation, a character, an avatar, or the like. The user may select from a variety of stock models that are provided by the system or application for the on-screen representation of the user. For example, the stock models for visually representing the user may include any character representation, such as a representation of a famous person, a piece of taffy, or an elephant. The stock model may be a fanciful character (e.g., a dragon, a monster) or symbol (e.g., a cursor or hand symbol).

The visual representation may comprise a combination of user features and an animation. For example, the visual representation of the user may be a monkey character, such as character 295, but wearing the user's clothes as captured in the physical space, or wearing glasses like the user detected in the physical space. The user's facial expressions, body position, words spoken, or any other detectable characteristic may be applied to the visual representation. The stock model may be specific to an application, such as packaged with a program, or the stock model may be available across-applications or available system-wide.

The user's gestures may cause a multimedia response that corresponds to the control associated with the gesture. For example, animations of the user's visual representation may be rendered on the display as a result of a gesture. The multimedia response may be any one or combination of an animations such as movements of the visual representation, text messages appearing on the screen, audio, still images, video, or the like. For example, if a user's gesture, recognized by the system executing a word processing application, comprises a page next gesture, the control of the word processing document may be to flip to the next page in the document. A visual representation associated with the user that performed the gesture may be, for example, a large cartoon hand with glasses that are similar to the user's glasses in the physical space as captured and identified by the gesture-based system. In response to the user's gesture to page next, the large cartoon hand may move across the screen and appear to grab a corner of the document and then pull down on it to reveal the next page in the document. Thus, not only may other users be aware that the particular user performed the gesture, based on observing the animation of the visual representation unique to the user, but the animation adds to the experience of controlling the system via gestures. The user can visualize the result of his or her gesture, and other users can visualize the results. The user may more readily confirm that the gesture was recognized and applied by the system properly.

The multimedia response may by system-wide, such as displaying an animation that appears on every other users' television or monitor. When a user causes his or her avatar to gesticulate, the gesture may be presented at all the client locations in synchronicity. Similarly, when a user speaks or otherwise produces an audio event, e.g., through voice chat, or textual event, e.g., through text chat, the audio or text may be presented at all the client locations in synchronicity.

A particular visual representation may be associated with a particular user. Thus, each user may have an avatar which is a virtual representation of himself or herself that may act out animations that correlate to gestures performed by the user. When the system displays an animation of a particular visual representation, the user and other users may discern the user associated with the particular visual representation. Thus, when the user gestures and the visual representation is animated to correspond to the control associated with the gesture, it is possible to discern which user performed the gesture based on which visual representation is animated. In another example embodiment, the visual representation of a user may be generic or common between users without distinguishing features. Thus, it may not always be possible to tell from the displayed animations which user corresponds to a particular visual representation.

In an example embodiment, the system may store information representative of motions of a tracked user, stored in a motion capture file. The system may apply the motions specific to a user from a specific motion capture file to an avatar or game character such that the avatar or game character may be animated to mimic motions in a similar manner to those of the user. For example, the motion capture file may comprise indications of the manner in which a user jumps. When a jumping animation is applied to the user's visual representation, the system may apply the jump from the motion capture file such that the visual representation mimics the actual motion of the user captured by the system. In another example embodiment, the capture file comprises generic motions that are common among users. For example, a jump from a motion capture file may be generic or pre-packaged with the system such that the visual representation performs the generic jump when applied by the system. The multimedia response may be a predetermined response, such as a stored animation or audio clip that is implemented in response to the identity of a particular gesture.

A multimedia response library may include options for representing a user's gestures as recognized by the system. For example, the multimedia response library may comprise animation data that is predetermined or pre-recorded and associated with a particular gesture. Alternately, the multimedia response may comprise a variety of options to implement upon the recognition of a particular gesture, and the selection may be made based on a variety of circumstances. For example, a particular animation may be selected because it is applicable to a particular application, to a particular user, to a particular gesture, to a particular motion, to a skill level, or the like.

In an example embodiment, the animations applied to the avatar may be animations selected from a library of pre-packaged animations, such as those that come with a program, application, or a system, for example. The animations selected may be those which correspond to the user's inputs learned by the system. In another example embodiment, the animations in the library may be animations entered and recorded by the user into the avatar's animation vocabulary.

Some animations may be applied to a user's visual representation, despite the user not having performed a gesture. For example, upon a deduction of the user's body language, the system may determine appropriate animations to apply to the visual representation of the user to reflect the user's temperament. In another example, the system may detect that a particular user is idle or has not gestured for a certain period of time. The system may animate a visual representation of the user to reflect the idleness of the user. For example, if the visual representation of the user is a monkey character, the system may apply an animation that comprises the monkey character grabbing a virtual pillow and displaying "ZZZZZ" near the monkey to imply that the monkey has fallen asleep.

In an example embodiment, the multimedia response may comprise a predetermined avatar animation shown combined with sounds. For example, when an avatar is caused to walk, light footsteps sounds may be played. In another example, when an avatar is caused to run, heavy footsteps sounds may be played. In another example, when an avatar is caused to strafe, scraping or sliding footstep sounds may be played. In another example, when an avatar is caused to bump into an object, a bumping sound may be played. In another example, when an avatar causes an object to fall or collide with another object, a heavy bumping sound may be played.

The level of animation or amount of animation may vary depending on, for example, the application currently executing or the demographic of the audience. For example, an application that is presenting legal documents during a court proceeding may not include as much animation than a presentation to children to teach about safety on a playground. Thus, there may be categories of animations and levels that are defined by the system and/or changed by a user to correspond to the user's preferences.

In an example, a presentation paradigm may be a sequential slide presentation in which there is a set of slides that are presented in a predetermined order. In another example, an application may present information in a manner that is not sequential. For example, a presentation may comprise a compilation of slides, pictures, images, text, etc, and the presentation may be organized into sections. During the presentation, the presenter can zoom in and out of individual slides and slide sections within a slide show. A predefined order may not be defined.

The display of presentation materials for such a non-sequential presentation may take many forms. For example, a main screen may comprise a map or a large flow chart. The user can zoom in on different portions of the map or flow chart and a slide (or slides) that corresponds to that portion may be enlarged on the screen. The user may move around on the map or flow chart without having to follow any predefined order. Consider a presentation format that comprises a hallway or a house with many doors displayed on the screen. A user may progressively jump around from door to door, enter doors, etc. The user can present slides using a zoomable canvas, that allows the user or participants from the audience to jump from one portion of the presentation to another, zoom in and out, and define sections. Audience members can navigate to different portions of the presentation via gestures and, as described above, a visual representation may interact with the various forms of presentation styles. Thus, the presentation may be a compilation of content, but not requiring a specific order for presenting. A user can essentially enter the virtual world via a visual representation and control aspects of the presentation via gestures. Thus, the gesture-based system may display a canvas of assets for discussion, and users may navigate through the information in real-time. The canvas may comprise a multitude of information, and a presenter can select portions of the canvas depending on the audience. The canvas or presentation may comprise more information than is presented, but because of the flexible format, the users and/or presenter may select sections of the information that are applicable for the discussion.

In an example embodiment, such as in the example scenarios shown in FIGS. 2A and 2B, there may be a single user or a primary user managing the presentation of information. For example, it may be desired that a single user is managing the presentation without interactive control from the audience members. Consider if user 260 is conducting a meeting or teaching a class of students—he or she may want sole control over the presentation. Thus, a single user may moderate the presentation of information and control the presentation of information via gestures, but other users' gestures in the room may not control the presentation of information. In another example embodiment, multiple users may be able to control aspects of the system. For example, it may be desired that multiple presenters can control aspects of the system or it may be desired that at least one audience member is given control. Thus, a team of users can share the control of a presentation via a single or multiple capture devices to better enable collaboration.

Users may share access, have limited access, or have no access to control aspects of the presentation. For example, a user may be a primary user, a secondary user, or an observing user, for example. A primary user is any user that has the option for controlling aspects of the system. A primary user may have the option to distribute control to other users. For example, a primary user may designate a second user in the room as another primary user, as a secondary user or as an observing user. An observing user may be a user that can interact with other users but does not control the system via gestures.

A secondary user may be granted the option to control aspects of the system. The secondary user may be given temporary control, the control may persist indefinitely once granted, or the control may persist until taken away. For example, a primary user may be presenting information, but not initially want interaction from the audience. However, at the end of the user's presentation, the primary user may solicit comments and feedback from the members of the audience. In an example, the primary user may select a specific user and give temporary access for the user to control the system while the secondary user is providing feedback. The secondary user may gesture to control the information displayed, such as by returning to a previous page in a word processing document, highlighting a section, or drawing virtual lines (e.g., circles and arrows) over the display. Thus, the secondary user can easily interact with the information via gestures, which may provide a more efficient and better understanding of the user's feedback. When complete, the primary user may remove the secondary user's access to control or the secondary user may relinquish control.

The control of the system may be transferred between users or shared between multiple users. The transfer or sharing of control via gestures provides an easier way for users to manage the information, for example, without requiring passing around controllers or having to move close to the computing environment to control aspects of the presentation. The users can interact with the system via gestures from their seats. More than one user may be a primary user, such as the case when there are multiple presenters. Each presenter may have control over specific aspects of the presentation such that, while they may co-present, the content presented may be specific and accessible by a specific user.

In another example, the primary user may open up the floor for feedback from any users, thereby providing secondary user access to any users in the room. The primary user may cause for access to the control of information via gestures by any participants, such as any users in attendance. For example, at the end of the presentation, the primary user may issue a command to the system to cause the system to process and recognize gestures by any user in the room and to translate the gesture to a control. In another example, the system can recognize a request for control and determine whether or not to grant the request. For example, a gesture for requesting control may comprise the raising of a user's arm straight up in the air. The system may recognize the gesture performed by a member of the audience. The system may indicate that a user has requested control via the gesture. The system may automatically provide the user with access to control aspects of the system upon recognition of the gesture requesting control, or the system may wait until authorization from the primary user to give the secondary user control.

In another example, the system may be directed, such as via a setting set by a presenter, to wait until a certain time in the presentation to provide any access by secondary users. For example, the system may be directed to wait for a primary user to request feedback, which may be indicated by a gesture for recognition by the system, before allowing other users to have control. In the meantime, however, the system could generate a queue of user requests by identifying each user that gestures to request control. Then, when the primary user is ready for feedback from the audience, the system may display the queue to indicate the order that users have requested control.

The system may identify other circumstances of the requesting user's gesture, such as the current presentation of information. For example, in the middle of a primary user's presentation, an audience member may gesture for requesting control, indicating the user's desire to give feedback and/or have control of the system. Rather than giving the audience member control at the time, as described above the system may recognize the user's gesture and identify the user in a queue. When the primary user requests feedback, the system may not only indicate the user's request, but may return to the point in the presentation that the user made the gesture. Thus, the system can automatically return to the display that was current at the time of the user's gesture.

It is noted that the data may be captured by any capture device that has the user in its field of view, and any computing environment networked to the capture device may employ gesture recognition techniques on the captured data. For example, gesture recognition may be employed by the main computing environment 210 on data captured by capture device 205. In another example, a computing environment associated with a particular user may recognize the gesture. For example, user 263 may interact with the computing environment 214 and capture device 204 may capture data representative of the user's 263 gesture.

The gestures for the same control of the system may vary. In the example above, a user may gesture for requesting control by raising a hand with a fully extended arm. However, the gesture for requesting control may be a small scale gesture, such as a finger or hand motion. The gestures may be defined to limit interruption in the flow of the presentation. The gestures may vary depending on the computing environment with which the user interacts. For example, the user 263 in FIG. 2B may interact with computing environment 214 on a small scale and gestures that are specific to a user or to a computing environment may apply. A user may have a defined set of gesture data that is available on the user's personal computing environment or cell phone, for example. The user may therefore gesture in a unique manner depending on the user's personal preferences.

The designation for a user's level of access may be granted via a plurality of available sources, such as by another user in the physical space or administrator of the application, the system itself, or the like. For example, the system may capture data in the physical space. From the capture data, the system may identify all four users 260, 261, 262, 263 in the physical space. The system may identify simply that a human target is in the physical space, or the system may be able to identify the specific user based on body/facial recognition techniques, for example. The system may designate a particular level of access for each user.

The system may designate a user's level of access based on presence alone or based on a user's position in the physical space. For example, the system may analyze the data captured by the capture device 202 shown in FIGS. 2A & 2B and identify a human from the captured data. Each user detected in the physical space may be designated with a particular level of access by default. For example, a user's level of access based on mere presence may be set as a default to secondary user access. The system may identify a user's level of access based on the user's position in the room. For example, seated users or users in a certain portion of a room or children, for example, may be designated by default as observing users. The designation of a user's level of access may be modified. The user's designation may be dynamic, changing to reflect the activity of the user's. For example, when a user is speaking, the system may focus on the speaking user for gesture control.

Various scenarios with multiple participants may each have different needs, and thus the various features described herein may be unique to a scenario and comprise any varied combination of features. For example, a first method from the example methods described herein or other such similar methods for identifying a primary user in the physical space may be more appropriate for a first scenario, but a second method for selecting the primary user may be more appropriate in another scenario. Similarly, access levels may vary depending on any number of characteristics, such as the application, the type of meeting, the type of users, the type of information presented, even the time of day or the lighting in the room.

In another example, a user may log in to the system and the user's identity may be associated with a particular level of access. For example, the creator of the presentation of information may be associated as a primary user, and upon identifying the creator in the physical space, the system may designate the target as a primary user. Other users detected by the system may be given a secondary user designation. Alternately, users that are to be in the audience of the primary user's presentation may log in to the system and be given a designation upon log in. Or, the primary user could define the level of access for the participants of the meeting.

A user profile may indicate the appropriate level of access for the particular user. For example, the system may have a database of user profile information (e.g., body or facial feature data) and may correlate a user to a user profile. The system may identify a specific user based on a user profile or based on body characteristics as identified from the captured data. For example, the system may analyze the data captured by the capture device 202 and employ body/facial recognition techniques to identify specific users. If a user profile does not exist for a user, the system may create one. The user's profile may provide an indication of the user's level of access to be employed by the system.

The user's designation as a primary user, secondary user, or observing user may be a permanent designation. Alternately, the designation may change or be changed. Further, the settings/limits/restrictions for each level of access may be modified. For example, a secondary user may have access to control aspects of the system, but may not have the authority to grant control to other users. However, the settings may be modified such that a secondary user may grant access to others. The system or an application may set levels of access based on default information, or the levels may be defined for specifically for a scenario.

As described above, a user may perform a gesture to designate another user's level of access. Gestures may also be applicable to control or manage aspects of the presentation of information. For example, if the presentation is executed in the form of a word processing application, the user may gesture to move forward or backward by a page in the document. Gestures may be applicable to highlight an aspect of the document and/or enlarge it on the screen for a closer analysis by the users with access to the displayed presentation.

A visual representation may correspond to the methods of sharing control of the system. For example, if the control of the system is transferred from one user to the next, the visual representation may remain the same but transfer the user to which it is associated to correspond to the user that has gained control. In another example, each user may have a visual representation associated with him or her, as described above. The system may indicate which users have current control by some indication related to the user's visual representation. For example, the visual representation of the user's that do not have control may be grayed out or fade from display. In another example embodiment, only the visual representation(s) of the users currently gesturing may be displayed and/or animated.

The designation of control may be accomplished via gestures. For example, a primary user may gesture in a certain manner to give a secondary user an option to control aspects of the system. Consider a primary user, such as user 260 in FIG. 2B, presenting to a group of users, such as users 261, 262, 263. The primary user may be using gestures to manage the presentation of information, such as changing the display, moving things around on the screen, drawing virtually on the screen, highlighting sections of a document, or the like.

The system may have access or otherwise store profiles that are not necessarily specific to a user, although they may be, but that comprise information related to different styles. For example, a style profile may comprise gesture information that is applicable for a type of presentation, a type of presenter, a type of audience, etc. Preferences may be set or default information may be included that define the gestures that apply for each style. A user may select the type of style profile to be implemented for a particular presentation. For example, if the presenter is a composer teaching music to a class of students, the gestures may be wide, sweeping gestures. However, if the presenter is a librarian with reserved gestures, the presenter may select gestures that comprise smaller scale motions. Consider the differences that may exist between a salesperson presenting information for a game to a group of potential customers versus an attorney that is presenting information to a jury during a court proceeding. The salesman may wish to present in an entertaining manner that may have an amusing tone. Thus, the style profile applicable for the presentation may be one of larger, sweeping motions, and the style profile may indicate that a visual representation with a high level of animation should be displayed. In the example of the court proceeding, however, the style profile may comprise smaller gestures and minimal animation.

As described above, remote computing environments may share resources over a network, including applications and control of the system via inputs from users in the respective physical space. Thus, a user remote to the physical space 201 shown in FIG. 2A or 2B may control an aspect of the system 200 by gesturing in the user's local physical space. Via a network, a computing environment local to the remote user may share information with other remote or local computing environments via a network, enabling a remote user to control, via gestures, an aspect of other computing environments networked to a system. Thus, if an application, for example, is executing on a remote system, the user's gestures may be processed an analyzed to control aspects of the remote system.

FIGS. 2D and 2E depict a system 200 that may comprise a capture device 202, a computing device 212, and a display device 222. For example, the capture device 202, computing device 212, and display device 222 may each comprise any suitable device that performs the desired functionality, such as the devices described herein.

FIGS. 2D and 2E depict the example target recognition, analysis, and tracking system from a side view and a top view, respectively, and an example embodiment of a user 265 interacting via point and focus functionality. This example portrays an example of control as it relates to a user's perspective. The user may interact with a system via pointing gestures, where the system is capable of both point and focus functionality. In other words, the system's analysis of the user's pointing gestures may be multi-dimensional, taking both the user's line of sight and hand motions into consideration to determine the user's focus on the screen. The capture device 202, for example, ay track the user's head position to determine the direction in which the user's head is turned. The capture device may have the fidelity to track the user's actual eye motion, detecting a line of sight of the user's eye that corresponds to a position on the screen. The system may also track the user's hand, arm, and finger motions, such as tracking the change in the position of the user's hand, arm, or fingers in the physical space. The system can analyze the motion and determine a line of sight between the user's body parts and an intended position of interest on the screen. By tracking the head/eye line of sight with hand/arm/finger coordinates, the system allows the user to motion or gesture with a more natural and intuitive motion, where the users points at a specific location on the screen, the system may use additional inputs from the capture device with respect to the user to determine the position of interest on the screen. The system may display a cursor or some other symbol on the screen that represents the system's interpretation of where the user is pointing.

FIG. 3 is an example of an exemplary networked or distributed system 300 that can incorporate the disclosed techniques for enhancing productivity scenarios. Of course, actual network and database environments may be arranged in a variety of configurations; however, the example environment shown here provides a framework for understanding the type of environment in which an embodiment may operate.

System 300 may include a network of computing environments 302, 304, 306, 308 and capture devices 312, 314, 316. Each of these entities 302, 304, 306, 308, 312, 314, and 316 may comprise or make use of programs, methods, data stores, programmable logic, etc. Users 322, 324, 326 and 328, are shown associated, locally, with computing environments 302, 306, 304, respectively. In various embodiments disclosed herein, a group of users may replicate the physical world experience of meeting with other users to collaborate in a meeting type setting. The experience may be replicated in a virtual world in which the users are in different physical locations and in communication via a network. A display at a user's location may render avatars representing the users of the group.

Computing environments 302, 304, 306, and 308 and capture devices 312, 314, and 316 may communicate over network 250. Network 250 may represent any number or type of network such that the computing environments 302, 304, 306, 308 in the same or different locations may be networked via any type, number, or combination of networks. The network 250 may be any network arranged so that messages may be passed from one part of the network to another over any number of links or nodes. For example, in accordance with an aspect of the presently disclosed subject matter, each entity computing environment, capture device, and display device may contain discrete functional program modules that might make use of an API, or other object, software, firmware and/or hardware, to request services of one or more of the other computing environments, capture devices, and display devices. Any number of users associated with any number of respective local computing environments may access the same application via the network 250. Thus, by communicating over a network 250, any number of users may interact with a plurality of other users via gestures. For example, gestures performed in a first location can be translated and mapped to a display in a plurality of locations, including the first location.

The network 250 may itself comprise other computing entities that provide services to the gesture-based system described herein, and may itself represent multiple interconnected networks. The network 250 may include, for example, an intranet, an internet, the Internet, a personal area network (PAN), a campus area network (CAN), a local area network (LAN), a wide area network (WAN), a computer network, a gaming network, or the like. The network 250 may also represent the technology that connects individual devices in the network, such as optical fibre, a public switched telephone network (PSTN), a cellular telephone network, a global Telex network, wireless LAN, Ethernet, power line communications, or the like. Computing environments may be connected together by wired or wireless systems, by local networks or widely distributed networks. Any appropriate wireless interface can be utilized for network communications. For example, the wireless link can be in accordance with the following protocols: GSM, CDMA, UMTS, LTE, WIMAX, WIFI, ZIGBEE, or a combination thereof. A network may include cloud or cloud computing. A cloud infrastructure, for example, may include a multitude of services delivered through data centers and built on servers. The services may be accessible anywhere that provides access to the networking infrastructure. The cloud may appear to be a single point of access to the user and the infrastructure may not be visible to a client.

As described above, a computing environment may be any suitable device for processing data received by the capture device, such as a dedicated video game console or a more general computing device, such as a cellular telephone or a personal computer. For exemplary purposes, computing environment 308 is a server, computing environment 306 is a mobile handheld computing device, and computing environments 302 and 306 represent any type of computing environment.

In these examples, a capture device, such as capture devices 312, 314, and 316 can capture a scene in a physical space in which a user is present. The user, such as user 322, 324, 326 and 328, may be within capture view, respectively, of the capture device 312, 314, and 316, in locations #1, #3, and #4. Each capture device can capture data representative of the user's gestures in that location. The capture device in each location may be connected to a local computing environment via a wired connection, a wireless connection, and/or via a network connection. For example, in location #1, capture device 312 is shown connected to computing environment 302 via a wire 304. A wired connection may comprise a cable coupling the capture device to the computing environment, such as an S-Video cable, a coaxial cable, an HDMI cable, a DVI cable, a VGA cable, or the like. The capture device may be adapted to plug directly in to the computing environment or may be otherwise incorporated into a computing environment that can process the capture data.

The capture device may provide the captured data to a computing environment for processing. The computing environment may employ gesture recognition techniques on the data, where the user may gesture to control aspects of a gesture-based system, including aspects of a computing environment or an application. In an example embodiment, the capture device may itself be the computing environment capable of processing the captured data. For example, any capture device 312, 314, 316 may have the capabilities, such as a processor, for processing the capture data and employing gesture recognition techniques. For example, in Location #2, capture device 314 is shown incorporated into the handheld computing device 304.

Each computing environment 302, 304, 306, 308 and a corresponding capture device is shown in locations, Location #1, Location #2, Location #3, and Location #4. As used herein, a location is a broad term including any location in which the various pieces of the system may be located. For example, the locations #1, #2, #3, and #4 may be very close to each other, such as different rooms in a house, very far apart from each other, such as in different states, or any combination thereof The locations may refer to specific locations throughout the same, general, local location. For example, each location #1, #2, #3, and #4 may refer to a specific location of a component of the system within a general location, such as a conference room. The various pieces of system 300 may communicate locally or remotely, such as via network 250.

Consider, for example, a networked system that may be found to accommodate a working environment. For example, location #1 and location #3 may represent the same conference room, such that computing environment 302, 306 and capture devices 312, 314 are in the same room. Local devices may be connected via a local connection such as via network 250. Location #2 may be a remote location such that a remote server 308 may be maintained at the remote location. And computing environment 304 may be a residence whereby the user works from home and is logged into the network 250 via a home network connection.

Thus, it is contemplated that a location refers to any location in which a device for capturing or processing gesture data may be located. In another example, consider a gaming network in which remote users connect to a gaming service hosted at server 308. The remote users in each location #1, #3, and #4 may connect via a network 250 and can play the same game against each other. In another example, the locations may be local where local users may be working on respective computing environments in the same room and interact with each other over a local area network 250.

A capture device may provide captured data to a computing environment for processing. The computing environment may employ gesture recognition techniques on the data, where the user may gesture to control aspects of a gesture-based system, including aspects of a computing environment or an application. In an example embodiment, the capture device may itself be the computing environment capable of processing the captured data. For example, any capture device 312, 314, 316 may have the capabilities, such as a processor, for processing the capture data and employing gesture recognition techniques. For example, in Location #2, capture device 314 is shown incorporated into the handheld computing device 304.

In location #1, capture device 312 is shown connected to computing environment 302 via a wire 305 but may also communicate with the local computing environment via the connection 251 to the network 250. For example, the capture device 312 and computing environment 302 in the same location #1 may be part of a home wireless network 250. The capture device 312 may capture data representative of the user's 322 gestures and provide the data, over the home wireless network 250, to computing environment 302. Thus, the capture device 312 and the computing environment 302 may be in different rooms, for example, in a more general location, location #1. For example, a computing environment 302 may be the central computing environment 302 in a home wireless network 250, and may be located in one room, such as an office. The capture device 312 and display 303 may be located in another room, such as a media or game room in the home. The capture device 312 may be networked to the computing environment 302 such that it can capture data of user 322, provide it to the computing environment 302 for processing, and receive outputs from the computing environment to the display 303.

Similarly, the computer environment or the capture device may output to a display that is local or remote to either or both of the computer environment or capture device. In location #1, for example, computing environment 302 is shown with a display component 303. It is contemplated, however, that similar to the capture device 304, the display 303 may be connected to the computing environment 302 via a wired connection, a wireless connection, and/or via a network connection. Thus, the display component 303 may be part of a home wireless network 250, for example, and receive outputs for display from the capture device 304 via a wire or via the network 250.

The components of a networked system can share information locally within a location or remotely across locations. In an example embodiment, the local computing environment 302 receives the data representative of user 322 from the capture device 312. The computing environment 302 may output to a local display, such as a display component 303 of the computing environment 302 or another display device otherwise connected to the computing environment 302. The computing environment 302 may alternately or also provide the data to a remote computing environment or a remote display component for display. For example, computing environment 302 may communicate with computing environment 316 over network 250. Computing environment 306 may receive data from the computing environment 302 and map the gestures of user 322 to a display component 307 local to computing environment 306.

In another example embodiment, the capture device 312 may provide the data over a network 250 for analysis or display by a remote computing environment, such as computing environment 304, 306, or 308. Thus, a computing environment remote to the user may process data captured by a capture device 312 local to the user 322 but display a visual representation of the user at the remote computing environment.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without needed any working details about the other program or the service itself. In a client/server architecture, particularly a networked system, a client is usually a computer that accesses shared network resources provided by another computer, e.g., a server. Any entity 302, 304, 306, 308, 312, 314, and 316 can be considered a client, a server, or both, depending on the circumstances. And, moreover, regarding the entertainment console, it can be a client to a server.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, it is contemplated that a location refers to any location in which a device for processing or capturing gesture data may be located. In another example, consider a gaming network in which remote users connect to a gaming service hosted at server 308. The remote users in each location #1, #3, and #4 may connect via a network 250 and can play the same game against each other. In another example, the locations may be local where local users may be working on respective computing environments in the same room and interact with each other via the same system components or via a local area network.

As used herein, reference to a system may be a reference to any single part of the system 200 shown in FIGS. 2A-3, any combination thereof, or any additional component or computing environment that can perform a similar function. For example, the computing environment 302 may provide the functionality described with respect to the computing device 212 shown in FIG. 1 or the computer described below with respect to FIG. 8. It is contemplated that the computing environments described herein, such as 210, 212, 213, 214, from FIGS. 1-2C or any one of the computing environments 302, 304, 306, 308 from FIG. 3, may be configured as a target recognition, analysis, and tracking system such as the target recognition, analysis, and tracking system 10 described with respect to FIG. 1, and any one of the computing environments may employ techniques for gesture recognition, scaling or translating. As shown in FIGS. 1, 2A-2E, and 3, the computing environments 210, 212, 213, 214 may include a display device or may otherwise be connected to a display device. The computing environment may comprise its own camera component, be connected to a standalone capture device, or may be connected to a device having a camera component, such as capture device 202. For example, computing environment 212 may be coupled to or otherwise receive gesture information for user 204 from the capture device 202 that can capture data from the physical space.

In light of the diverse computing environments that may be built according to the general framework provided herein and the further diversification that can occur in computing in a network environment such as that of FIG. 3, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Finally, it should also be noted that the various techniques described herein may be implemented in connection with hardware or software or, where appropriate, with a combination of both. Thus, the methods, computer readable media, and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing environment may generally include a processor, a storage medium readable by the processor (including volatile and non-volatile memory and/or storage elements), at least one input device, and at least one output device. One or more programs that may utilize the creation and/or implementation of domain-specific programming models aspects of the present disclosure, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
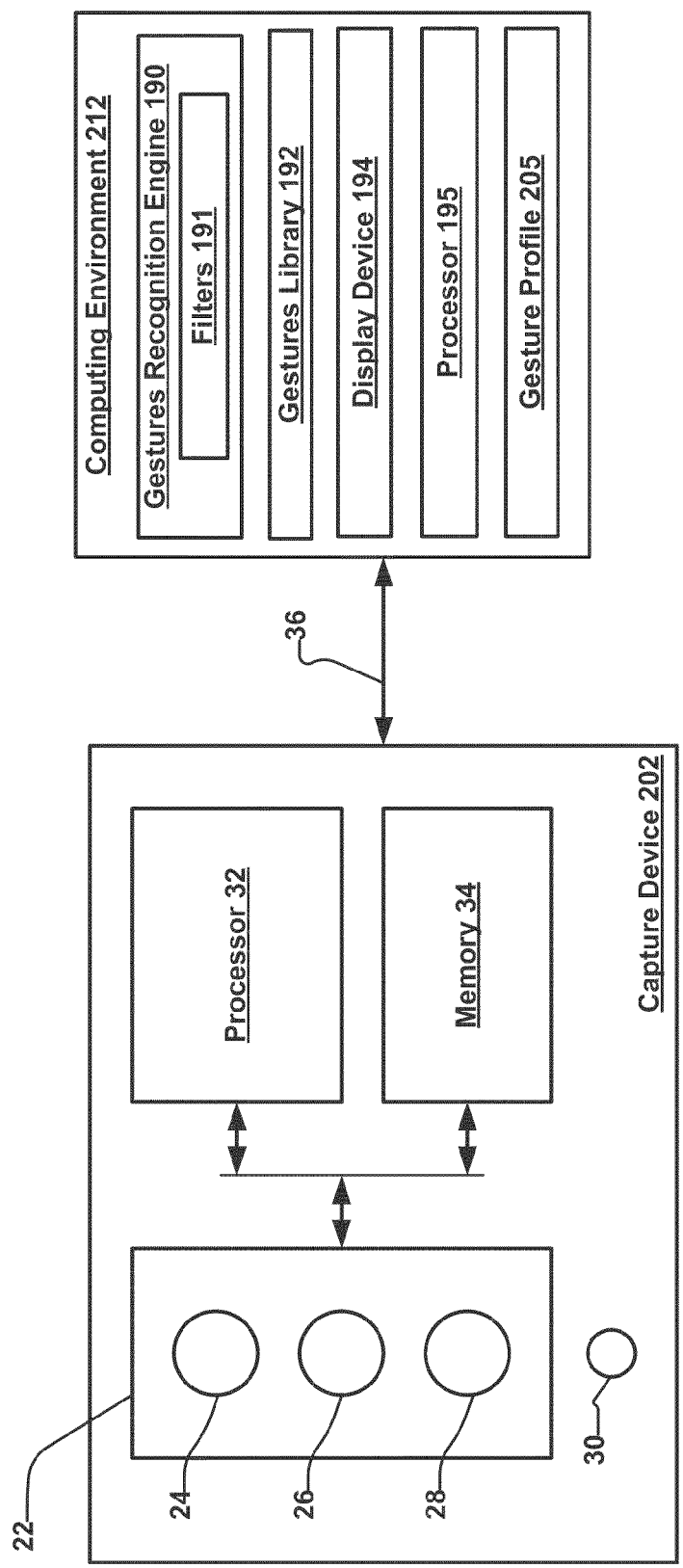
FIG. 4 illustrates an example embodiment of a capture device that may be used in a target recognition, analysis, and tracking system.

FIG. 4 illustrates an example embodiment of the capture device 202 that may be used for target recognition, analysis, and tracking, where the target can be a user or an object. According to an example embodiment, the capture device 202 may be configured to capture video with depth information including a depth image that may include depth values via any suitable technique including, for example, time-of-flight, structured light, stereo image, or the like. According to one embodiment, the capture device 202 may organize the calculated depth information into "Z layers," or layers that may be perpendicular to a Z axis extending from the depth camera along its line of sight.

As shown in FIG. 4, the capture device 202 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 202 may emit an infrared light onto the scene and may then use sensors (not shown) to detect the backscattered light from the surface of one or more targets and objects in the scene using, for example, the 3-D camera 26 and/or the RGB camera 28. In some embodiments, pulsed infrared light may be used such that the time between an outgoing light pulse and a corresponding incoming light pulse may be measured and used to determine a physical distance from the capture device 202 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 202 to a particular location on the targets or objects.

According to another example embodiment, time-of-flight analysis may be used to indirectly determine a physical distance from the capture device 202 to a particular location on the targets or objects by analyzing the intensity of the reflected beam of light over time via various techniques including, for example, shuttered light pulse imaging.

In another example embodiment, the capture device 202 may use a structured light to capture depth information. In such an analysis, patterned light (i.e., light displayed as a known pattern such as grid pattern or a stripe pattern) may be projected onto the scene via, for example, the IR light component 24. Upon striking the surface of one or more targets or objects in the scene, the pattern may become deformed in response. Such a deformation of the pattern may be captured by, for example, the 3-D camera 26 and/or the RGB camera 28 and may then be analyzed to determine a physical distance from the capture device 202 to a particular location on the targets or objects.

According to another embodiment, the capture device 202 may include two or more physically separated cameras that may view a scene from different angles, to obtain visual stereo data that may be resolved to generate depth information. In another example embodiment, the capture device 202 may use point cloud data and target digitization techniques to detect features of the user.

The capture device 202 may further include a microphone 30, or an array of microphones. The microphone 30 may include a transducer or sensor that may receive and convert sound into an electrical signal. According to one embodiment, the microphone 30 may be used to reduce feedback between the capture device 202 and the computing environment 212 in the target recognition, analysis, and tracking system 10. Additionally, the microphone 30 may be used to receive audio signals that may also be provided by the user to control applications such as game applications, non-game applications, or the like that may be executed by the computing environment 212.

In an example embodiment, the capture device 202 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction. For example, the computer-readable medium may comprise computer executable instructions for receiving data of a scene, wherein the data includes data representative of the target in a physical space. The instructions comprise instructions for gesture profile personalization and gesture profile roaming, as described herein.

The capture device 202 may further include a memory component 34 that may store the instructions that may be executed by the processor 32, images or frames of images captured by the 3-d camera 26 or RGB camera 28, or any other suitable information, images, or the like. According to an example embodiment, the memory component 34 may include random access memory (RAM), read only memory (ROM), cache, Flash memory, a hard disk, or any other suitable storage component. As shown in FIG. 4, in one embodiment, the memory component 34 may be a separate component in communication with the image capture component 22 and the processor 32. According to another embodiment, the memory component 34 may be integrated into the processor 32 and/or the image capture component 22.

As shown in FIG. 4, the capture device 202 may be in communication with the computing environment 212 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 212 may provide a clock to the capture device 202 that may be used to determine when to capture, for example, a scene via the communication link 36.

Additionally, the capture device 202 may provide the depth information and images captured by, for example, the 3-D camera 26 and/or the RGB camera 28, and a skeletal model that may be generated by the capture device 202 to the computing environment 212 via the communication link 36. The computing environment 212 may then use the skeletal model, depth information, and captured images to, for example, control an application such as a game or word processor. For example, as shown, in FIG. 4, the computing environment 212 may include a gestures library 192.

As shown, in FIG. 4, the computing environment 212 may include a gestures library 192 and a gestures recognition engine 190. The gestures recognition engine 190 may include a collection of gesture filters 191. A filter may comprise code and associated data that can recognize gestures or otherwise process depth, RGB, or skeletal data. Each filter 191 may comprise information defining a gesture along with parameters, or metadata, for that gesture. For instance, a throw, which comprises motion of one of the hands from behind the rear of the body to past the front of the body, may be implemented as a gesture filter 191 comprising information representing the movement of one of the hands of the user from behind the rear of the body to past the front of the body, as that movement would be captured by a depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

While it is contemplated that the gestures recognition engine 190 may include a collection of gesture filters, where a filter may comprise code or otherwise represent a component for processing depth, RGB, or skeletal data, the use of a filter is not intended to limit the analysis to a filter. The filter is a representation of an example component or section of code that analyzes data of a scene received by a system, and comparing that data to base information that represents a gesture. As a result of the analysis, the system may produce an output corresponding to whether the input data corresponds to the gesture. The base information representing the gesture may be adjusted to correspond to the recurring feature in the history of data representative of the user's capture motion. The base information, for example, may be part of a gesture filter as described above. But, any suitable manner for analyzing the input data and gesture data is contemplated.

In an example embodiment, a gesture may be recognized as a trigger for the entry into a modification mode, where a user can modify gesture parameters in the user's gesture profile. For example, a gesture filter 191 may comprise information for recognizing a modification trigger gesture. If the modification trigger gesture is recognized, the application may go into a modification mode. The modification trigger gesture may vary between applications, between systems, between users, or the like. For example, the same gesture in a tennis gaming application may not be the same modification trigger gesture in a bowling game application.

The data captured by the cameras 26, 28 and device 202 in the form of the skeletal model and movements associated with it may be compared to the gesture filters 191 in the gestures library 192 to identify when a user (as represented by the skeletal model) has performed one or more gestures. Thus, inputs to a filter such as filter 191 may comprise things such as joint data about a user's joint position, like angles formed by the bones that meet at the joint, RGB color data from the scene, and the rate of change of an aspect of the user. As mentioned, parameters may be set for the gesture. Outputs from a filter 191 may comprise things such as the confidence that a given gesture is being made, the speed at which a gesture motion is made, and a time at which the gesture occurs.

The computing environment 212 may include a processor 195 that can process the depth image to determine what targets are in a scene, such as a user 18 or an object in the room. This can be done, for instance, by grouping together of pixels of the depth image that share a similar distance value. The image may also be parsed to produce a skeletal representation of the user, where features, such as joints and tissues that run between joints are identified. There exist skeletal mapping techniques to capture a person with a depth camera and from that determine various spots on that user's skeleton, joints of the hand, wrists, elbows, knees, nose, ankles, shoulders, and where the pelvis meets the spine. Other techniques include transforming the image into a body model representation of the person and transforming the image into a mesh model representation of the person.

In an embodiment, the processing is performed on the capture device 202 itself, and the raw image data of depth and color (where the capture device 202 comprises a 3D camera 26) values are transmitted to the computing environment 212 via link 36. In another embodiment, the processing is performed by a processor 32 coupled to the camera 402 and then the parsed image data is sent to the computing environment 212. In still another embodiment, both the raw image data and the parsed image data are sent to the computing environment 212. The computing environment 212 may receive the parsed image data but it may still receive the raw data for executing the current process or application. For instance, if an image of the scene is transmitted across a computer network to another user, the computing environment 212 may transmit the raw data for processing by another computing environment.

The computing environment 212 may use the gestures library 192 along with a gesture profile 205 such as that shown in FIG. 4 to interpret movements of the skeletal model and to control an application based on the movements. The computing environment 212 can model and display a representation of a user, such as in the form of an avatar or a pointer on a display, such as in a display device 193. Display device 193 may include a computer monitor, a television screen, or any suitable display device. For example, a camera-controlled computer system may capture user image data and display user feedback on a television screen that maps to the user's gestures. The user feedback may be displayed as an avatar on the screen such as shown in FIG. 1. The avatar's motion can be controlled directly by mapping the avatar's movement to those of the user's movements. The user's gestures may be interpreted control certain aspects of the application.

According to an example embodiment, the target may be a human target in any position such as standing or sitting, a human target with an object, two or more human targets, one or more appendages of one or more human targets or the like that may be scanned, tracked, modeled and/or evaluated to generate a virtual screen, compare the user to one or more stored profiles and/or to store a gesture profile 205 associated with the user in a computing environment such as computing environment 212. The gesture profile 205 may be specific to a user, application, or a system. The gesture profile 205 may be accessible via an application or be available system-wide, for example. The gesture profile 205 may include lookup tables for loading specific user profile information. The virtual screen may interact with an application that may be executed by the computing environment 212 described above with respect to FIG. 1.

The gesture profile 205 may include user identification data such as, among other things, the target's scanned or estimated body size, skeletal models, body models, voice samples or passwords, the target's gender, the targets age, previous gestures, target limitations and standard usage by the target of the system, such as, for example a tendency to sit, left or right handedness, or a tendency to stand very near the capture device. This information may be used to determine if there is a match between a target in a capture scene and one or more users. If there is a match, the gesture profiles 205 for the user may be loaded and, in one embodiment, may allow the system to adapt the gesture recognition techniques to the user, or to adapt other elements of the computing or gaming experience according to the gesture profile 205.

One or more gesture profiles 205 may be stored in computer environment 212 and used in a number of user sessions, or one or more profiles may be created for a single session only. Users may have the option of establishing a profile where they may provide information to the system such as a voice or body scan, age, personal preferences, right or left handedness, an avatar, a name or the like. Gesture profiles may also be generated or provided for "guests" who do not provide any information to the system beyond stepping into the capture space. A temporary personal profile may be established for one or more guests. At the end of a guest session, the guest gesture profile may be stored or deleted.

The gestures library 192, gestures recognition engine 190, and gesture profile 205 may be implemented in hardware, software or a combination of both. For example, the gestures library 192, and gestures recognition engine 190 may be implemented as software that executes on a processor, such as processor 195 of the computing environment 212 shown in FIG. 4, or on processing unit 101 of FIG. 7, or processing unit 259 of FIG. 8.

It is emphasized that the block diagrams depicted in FIG. 4 and FIGS. 7 and 8 described below are exemplary and not intended to imply a specific implementation. Thus, the processors 195 or 32 in FIG. 4, the processing unit 101 of FIG. 7, and the processing unit 259 of FIG. 8, can be implemented as a single processor or multiple processors. Multiple processors can be distributed or centrally located. For example, the gestures library 192 may be implemented as software that executes on the processor 32 of the capture device or it may be implemented as software that executes on the processor 195 in the computing environment 212. Any combinations of processors that are suitable for performing the techniques disclosed herein are contemplated. Multiple processors can communicate wirelessly, via hard wire, or a combination thereof.

The gestures library and filter parameters may be tuned for an application or a context of an application by a gesture tool. A context may be a cultural context, and it may be an environmental context. A cultural context refers to the culture of a user using a system. Different cultures may use similar gestures to impart markedly different meanings. For instance, an American user who wishes to tell another user to "look" or "use his eyes" may put his index finger on his head close to the distal side of his eye. However, to an Italian user, this gesture may be interpreted as a reference to the mafia.

Similarly, there may be different contexts among different environments of a single application. Take a first-user shooter game that involves operating a motor vehicle. While the user is on foot, making a first with the fingers towards the ground and extending the first in front and away from the body may represent a punching gesture. While the user is in the driving context, that same motion may represent a "gear shifting" gesture.

Gestures may be grouped together into genre packages of complimentary gestures that are likely to be used by an application in that genre. Complimentary gestures—either complimentary as in those that are commonly used together, or complimentary as in a change in a parameter of one will change a parameter of another—may be grouped together into genre packages. These packages may be provided to an application, which may select at least one. The application may tune, or modify, the parameter of a gesture or gesture filter 191 to best fit the unique aspects of the application. When that parameter is tuned, a second, complimentary parameter (in the inter-dependent sense) of either the gesture or a second gesture is also tuned such that the parameters remain complimentary. Genre packages for video games may include genres such as first-user shooter, action, driving, and sports.

Figure 5A:
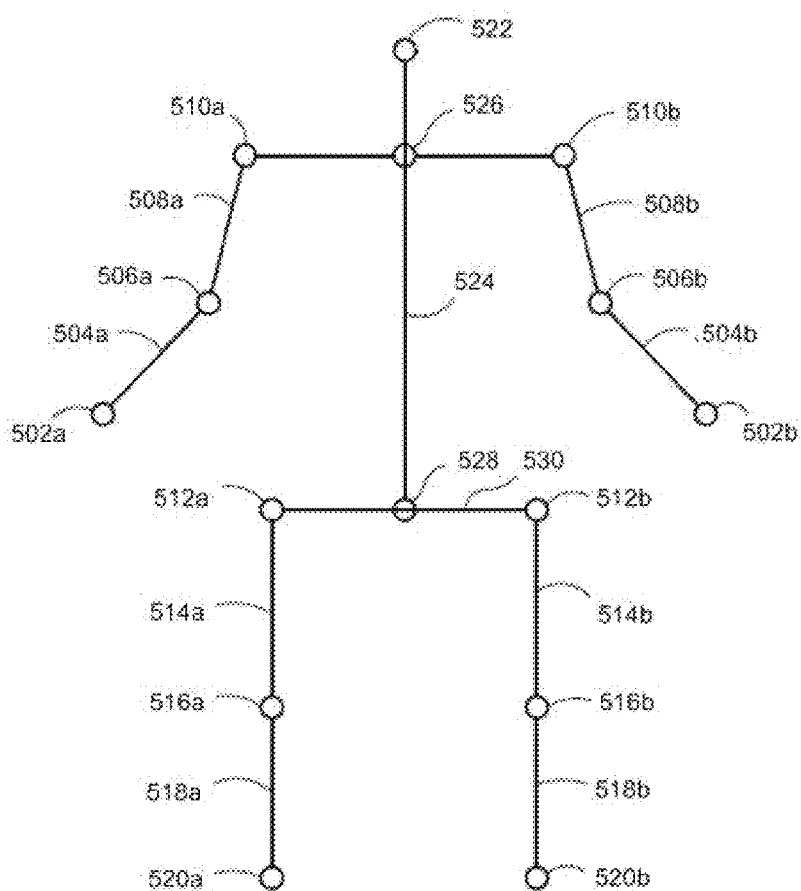
FIG. 5A illustrates a skeletal mapping of a user that has been generated from a target recognition, analysis, and tracking system such as that shown in FIG. 3.

FIG. 5A depicts an example skeletal mapping of a user that may be generated from the capture device 202. In this embodiment, a variety of joints and bones are identified: each hand 502, each forearm 504, each elbow 506, each bicep 508, each shoulder 510, each hip 512, each thigh 514, each knee 516, each foreleg 518, each foot 520, the head 522, the torso 524, the top 526 and bottom 528 of the spine, and the waist 530. Where more points are tracked, additional features may be identified, such as the bones and joints of the fingers or toes, or individual features of the face, such as the nose and eyes.

Through moving his body, a user may create gestures. A gesture comprises a motion or pose by a user that may be captured as image data and parsed for meaning. A gesture may be dynamic, comprising a motion, such as mimicking throwing a ball. A gesture may be a static pose, such as holding one's crossed forearms 504 in front of his torso 524. A gesture may be a single movement (e.g., a jump) or a continuous gesture (e.g., driving), and may be short in duration or long in duration (e.g., driving for 202 minutes). A gesture may also incorporate props, such as by swinging a mock sword. A gesture may comprise more than one body part, such as clapping the hands 502 together, or a subtler motion, such as pursing one's lips.

A user's gestures may be used for input in a general computing context. For instance, various motions of the hands 502 or other body parts may correspond to common system wide tasks such as navigate up or down in a hierarchical list, open a file, close a file, and save a file. For instance, a user may hold his hand with the fingers pointing up and the palm facing the capture device 202. He may then close his fingers towards the palm to make a fist, and this could be a gesture that indicates that the focused window in a window-based user-interface computing environment should be closed. Gestures may also be used in a video-game-specific context, depending on the game. For instance, with a driving game, various motions of the hands 502 and feet 520 may correspond to steering a vehicle in a direction, shifting gears, accelerating, and breaking. Thus, a gesture may indicate a wide variety of motions that map to a displayed user representation, and in a wide variety of applications, such as video games, text editors, word processing, data management, etc.

A user may generate a gesture that corresponds to walking or running, by walking or running in place himself. For example, the user may alternately lift and drop each leg 512-520 to mimic walking without moving. The system may parse this gesture by analyzing each hip 512 and each thigh 514. A step may be recognized when one hip-thigh angle (as measured relative to a vertical line, wherein a standing leg has a hip-thigh angle of 0°, and a forward horizontally extended leg has a hip-thigh angle of 90°) exceeds a certain threshold relative to the other thigh. A walk or run may be recognized after some number of consecutive steps by alternating legs. The time between the two most recent steps may be thought of as a period. After some number of periods where that threshold angle is not met, the system may determine that the walk or running gesture has ceased.

Given a "walk or run" gesture, an application may set values for parameters associated with this gesture. These parameters may include the above threshold angle, the number of steps required to initiate a walk or run gesture, a number of periods where no step occurs to end the gesture, and a threshold period that determines whether the gesture is a walk or a run. A fast period may correspond to a run, as the user will be moving his legs quickly, and a slower period may correspond to a walk.

A gesture may be associated with a set of default parameters at first that the application may override with its own parameters. In this scenario, an application is not forced to provide parameters, but may instead use a set of default parameters that allow the gesture to be recognized in the absence of application-defined parameters. Information related to the gesture may be stored for purposes of pre-canned gesture animation.

There are a variety of outputs that may be associated with the gesture. There may be a baseline "yes or no" as to whether a gesture is occurring. There also may be a confidence level, which corresponds to the likelihood that the user's tracked movement corresponds to the gesture. This could be a linear scale that ranges over floating point numbers between 0 and 1, inclusive. Wherein an application receiving this gesture information cannot accept false-positives as input, it may use only those recognized gestures that have a high confidence level, such as at least 0.95. Where an application must recognize every instance of the gesture, even at the cost of false-positives, it may use gestures that have at least a much lower confidence level, such as those merely greater than 0.2. The gesture may have an output for the time between the two most recent steps, and where only a first step has been registered, this may be set to a reserved value, such as -1 (since the time between any two steps must be positive). The gesture may also have an output for the highest thigh angle reached during the most recent step.

Another exemplary gesture is a "heel lift jump." In this, a user may create the gesture by raising his heels off the ground, but keeping his toes planted. Alternatively, the user may jump into the air where his feet 520 leave the ground entirely. The system may parse the skeleton for this gesture by analyzing the angle relation of the shoulders 510, hips 512 and knees 516 to see if they are in a position of alignment equal to standing up straight. Then these points and upper 526 and lower 528 spine points may be monitored for any upward acceleration. A sufficient combination of acceleration may trigger a jump gesture. A sufficient combination of acceleration with a particular gesture may satisfy the parameters of a transition point.

Given this "heel lift jump" gesture, an application may set values for parameters associated with this gesture. The parameters may include the above acceleration threshold, which determines how fast some combination of the user's shoulders 510, hips 512 and knees 516 must move upward to trigger the gesture, as well as a maximum angle of alignment between the shoulders 510, hips 512 and knees 516 at which a jump may still be triggered. The outputs may comprise a confidence level, as well as the user's body angle at the time of the jump.

Setting parameters for a gesture based on the particulars of the application that will receive the gesture are important in accurately identifying gestures. Properly identifying gestures and the intent of a user greatly helps in creating a positive user experience.

An application may set values for parameters associated with various transition points to identify the points at which to use pre-canned animations. Transition points may be defined by various parameters, such as the identification of a particular gesture, a velocity, an angle of a target or object, or any combination thereof If a transition point is defined at least in part by the identification of a particular gesture, then properly identifying gestures assists to increase the confidence level that the parameters of a transition point have been met.

Another parameter to a gesture may be a distance moved. Where a user's gestures control the actions of an avatar in a virtual environment, that avatar may be arm's length from a ball. If the user wishes to interact with the ball and grab it, this may require the user to extend his arm 502-510 to full length while making the grab gesture. In this situation, a similar grab gesture where the user only partially extends his arm 502-510 may not achieve the result of interacting with the ball. Likewise, a parameter of a transition point could be the identification of the grab gesture, where if the user only partially extends his arm 502-510, thereby not achieving the result of interacting with the ball, the user's gesture also will not meet the parameters of the transition point.

A gesture or a portion thereof may have as a parameter a volume of space in which it must occur. This volume of space may typically be expressed in relation to the body where a gesture comprises body movement. For instance, a football throwing gesture for a right-handed user may be recognized only in the volume of space no lower than the right shoulder 510a, and on the same side of the head 522 as the throwing arm 502a-310a. It may not be necessary to define all bounds of a volume, such as with this throwing gesture, where an outer bound away from the body is left undefined, and the volume extends out indefinitely, or to the edge of scene that is being monitored.

Figure 5B:
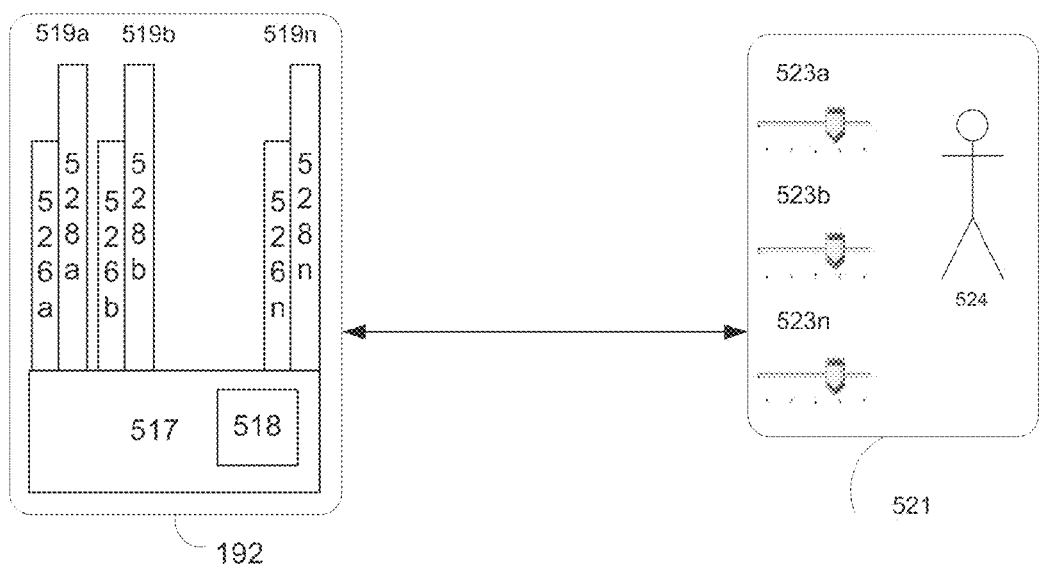
FIG. 5B illustrates further details of a gesture recognizer architecture such as that shown in FIG. 4.

FIG. 5B provides further details of one exemplary embodiment of the gesture recognizer engine 190 of FIG. 4. As shown, the gesture recognizer engine 190 may comprise at least one filter 519 to determine a gesture or gestures. A filter 519 comprises information defining a gesture 526 (hereinafter referred to as a "gesture"), and may comprise at least one parameter 528, or metadata, for that gesture 526. For instance, a throw, which comprises motion of one of the hands from behind the rear of the body to past the front of the body, may be implemented as a gesture 526 comprising information representing the movement of one of the hands of the user from behind the rear of the body to past the front of the body, as that movement would be captured by the depth camera. Parameters 528 may then be set for that gesture 526. Where the gesture 526 is a throw, a parameter 528 may be a threshold velocity that the hand has to reach, a distance the hand must travel (either absolute, or relative to the size of the user as a whole), and a confidence rating by the recognizer engine 190 that the gesture 526 occurred. These parameters 528 for the gesture 526 may vary between applications, between contexts of a single application, or within one context of one application over time.

Filters may be modular or interchangeable. In an embodiment, a filter has a number of inputs, each of those inputs having a type, and a number of outputs, each of those outputs having a type. In this situation, a first filter may be replaced with a second filter that has the same number and types of inputs and outputs as the first filter without altering any other aspect of the recognizer engine 190 architecture. For instance, there may be a first filter for driving that takes as input skeletal data and outputs a confidence that the gesture 526 associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter 528. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, like angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The gesture recognizer engine 190 may have a base recognizer engine 517 that provides functionality to a gesture filter 519. In an embodiment, the functionality that the recognizer engine 517 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

The base recognizer engine 517 may include a gesture profile 520. For example, the base recognizer engine 517 may load a gesture profile 520 into the gesture recognition engine temporarily for a user, store the gesture profile 520 with the gesture filter information, or otherwise access the gesture profile 520 from a remote location. The gesture profile 520 may provide parameters that adapt the information in the filters 519 to correspond to a specific user. For example, as described above, a gesture 526 may be a throw having a parameter 528 for a threshold velocity or a distance the hand must travel. The gesture profile 520 may redefine the threshold velocity or a distance the hand must travel for the throwing gesture 526. The base recognizer engine 517, therefore, may supplement or replace parameters in the filter 519 with parameters from the gesture profile 520. The filters 519 may be default gesture information and the gesture profile 520 may be loaded specifically for a particular user.

Filters 519 are loaded and implemented on top of the base recognizer engine 517 and can utilize services provided by the engine 517 to all filters 519. In an embodiment, the base recognizer engine 517 processes received data to determine whether it meets the requirements of any filter 519. Since these provided services, such as parsing the input, are provided once by the base recognizer engine 517 rather than by each filter 519, such a service need only be processed once in a period of time as opposed to once per filter 519 for that period, so the processing required to determine gestures is reduced.

An application may use the filters 519 provided by the recognizer engine 190, or it may provide its own filter 519, which plugs in to the base recognizer engine 517. Similarly, the gesture profile may plug in to the base recognizer engine 517. In an embodiment, all filters 519 have a common interface to enable this plug-in characteristic. Further, all filters 519 may utilize parameters 528, so a single gesture tool as described below may be used to debug and tune the entire filter system 519.

These parameters 528 may be tuned for an application or a context of an application by a gesture tool 521. In an embodiment, the gesture tool 521 comprises a plurality of sliders 523, each slider 523 corresponding to a parameter 528, as well as a pictorial representation of a body 524. As a parameter 528 is adjusted with a corresponding slider 523, the body 524 may demonstrate both actions that would be recognized as the gesture with those parameters 528 and actions that would not be recognized as the gesture with those parameters 528, identified as such. This visualization of the parameters 528 of gestures provides an effective means to both debug and fine tune a gesture.

Figure 6:
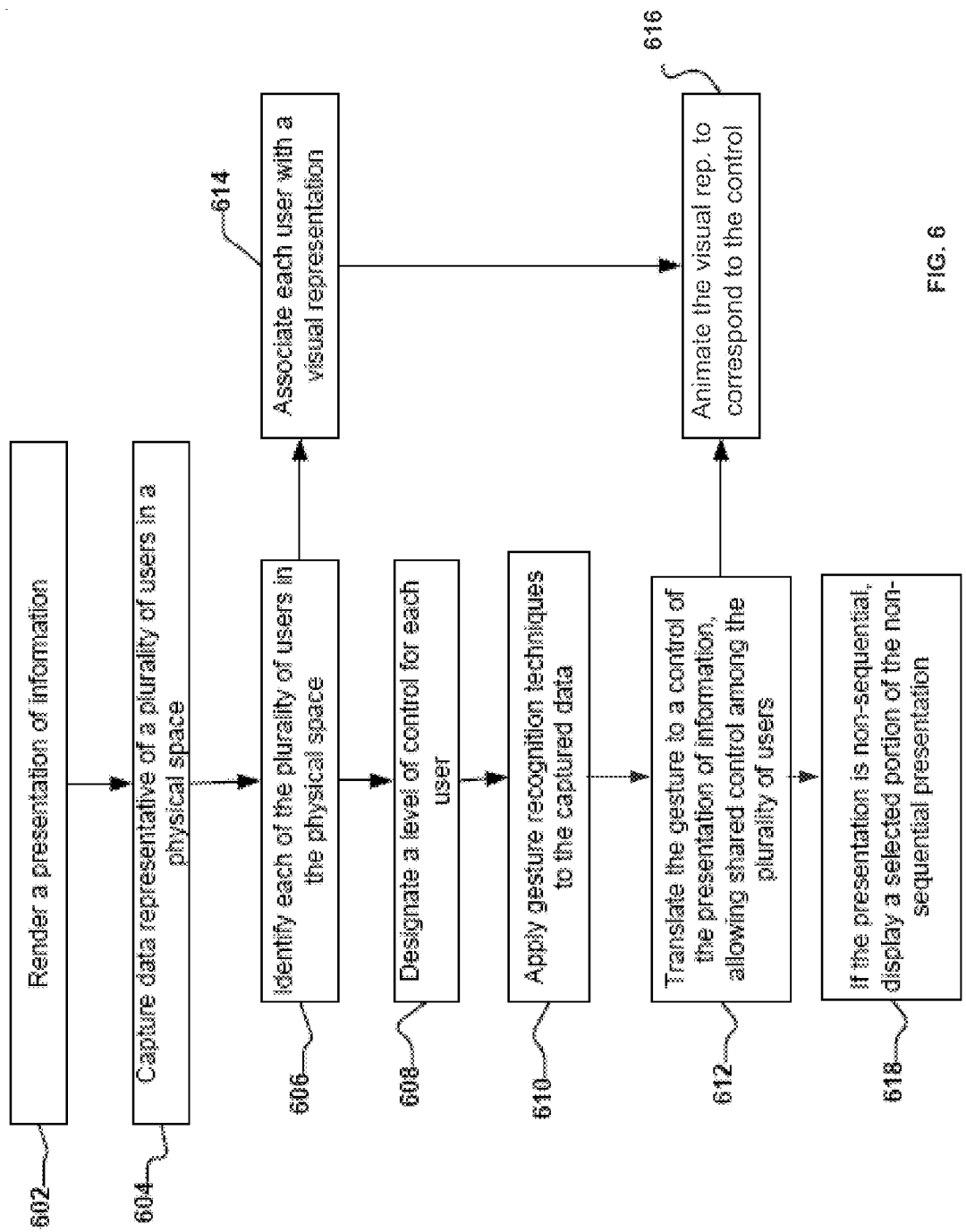
FIG. 6 depicts an example flow diagram for a method of establishing a shared presentation experience and generating visual representations to represent the multiple users in the physical space.

FIG. 6 depicts an example flow diagram for a method establishing a shared presentation experience for a plurality of users. For example, a system 200, 300 such as that shown in FIGS. 1-3 may perform the operations shown here.

At 602, the system may render a presentation of information. As described above, a presentation of information may include any productivity scenario in which information is being presented, where the presentation may take a variety of formats. At 604, the system may capture data from a physical space that includes a target, such as a user or a non-human object. As described above, a capture device can capture data of a scene, such as the depth image of the scene and scan targets in the scene. The capture device may determine whether one or more targets in the scene correspond to a human target such as a user. For example, to determine whether a target or object in the scene corresponds to a human target, each of the targets may be flood filled and compared to a pattern of a human body model. Each target or object that matches the human body model may then be scanned to generate a skeletal model associated therewith. For example, a target identified as a human may be scanned to generate a skeletal model associated therewith. The skeletal model may then be provided to the computing environment for tracking the skeletal model and rendering a visual representation associated with the skeletal model.

Any known technique or technique disclosed herein that provides the ability to scan a known/unknown object, scan a human, and scan background aspects in a scene (e.g., floors, walls) may be used to detect features of a target in the physical space. The scan data for each, which may include a combination of depth and RGB data, may be used to create a three-dimensional model of the object. The RGB data is applied to the corresponding area of the model. Temporal tracking, from frame to frame, can increase confidence and adapt the object data in real-time. Thus, the object properties and tracking of changes in the object properties over time may be used to reliably track objects that change in position and orientation from frame to frame in real time. The capture device captures data at interactive rates, increasing the fidelity of the data and allowing the disclosed techniques to process the raw depth data, digitize the objects in the scene, extract the surface and texture of the object, and perform any of these techniques in real-time such that the display can provide a real-time depiction of the scene. Further, multiple capture devices may capture data of a physical space. The data may be merged such that the fidelity of gesture recognition increases where recognition is based on additional data. A capture device may be focused on a single user or may capture data with respect to many users. If there are multiple capture devices that can share data, then if a first capture device does not have a view or does not have a good view of a user, a second capture device in the physical space may capture data of the user.

The system may identify each of the users in the physical space at 606 and associate each user with a visual representation at 614. The system may designate a level of control for each user at 608, wherein the control is accomplished via gestures in the physical space. For example, a user may be a primary user, a secondary user, or an observing user. Depending on the gesture and the user that performs the gesture, gestures may control aspects of the presentation of information. The system may determine if a user performs a gesture at 610 and use the gesture to control a program at 612. For example, a gesture may comprise a user's position or motion that may be captured as image data and parsed for meaning. The parsed image data can be filtered by a gesture recognition engine, for example, to determine if a gesture was performed at 610. Thus, via the gesture-based system, a presentation of information may be controllable by a plurality of users. Control may be shared, transferred, or the like for the various participants to the presentation.

A visual representation may be associated with each user at 614 and the system may animate the visual representation at 616 to correspond to the gesture or to a control that results from the gesture. The visual representation may be associated with more than one user, or each user may have a unique visual representation. For example, if multiple users are associated with the same visual representation, the system may transfer control between users.

At 618, if the presentation of information is non-sequential, as described above, the gesture may control an aspect of the non-sequential information. Thus, a gesture may apply to the user's selection of the desired portion of the non-sequential information. A display of the selected portion may provide a conversion of a canvas of non-sequential information to a focused portion of such canvas. The user can navigate through the canvas to change the focused portion of the assets available in the presentation.

The computer executable instructions may comprise instructions for establishing a shared presentation experience and transferring control between users, as described herein. Any of the methods for the shared presentation experience via gestures described herein may be implemented as computer executable instructions.

Figure 7:
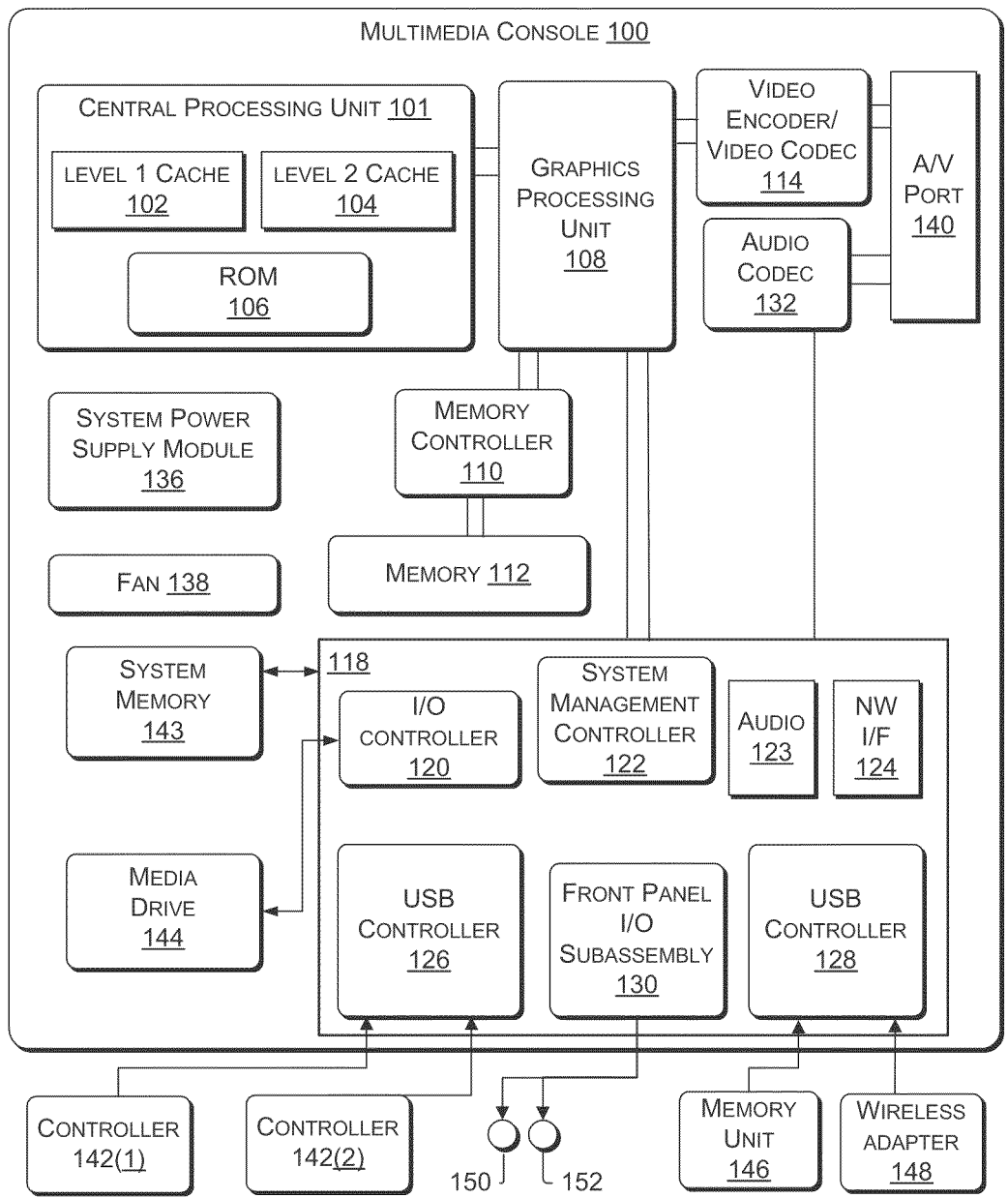
FIG. 7 illustrates an example embodiment of a computing environment in which the techniques described herein may be embodied.

FIG. 7 illustrates an example embodiment of a computing environment that may be used to interpret one or more gestures in a target recognition, analysis, and tracking system. The computing environment such as the computing environment 212 described above with respect to FIG. 1 may be a multimedia console 100, such as a gaming console. As shown in FIG. 7, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an AN (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 2120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 2124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs.), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 26, 28 and capture device 202 may define additional input devices for the console 100.

Figure 8:
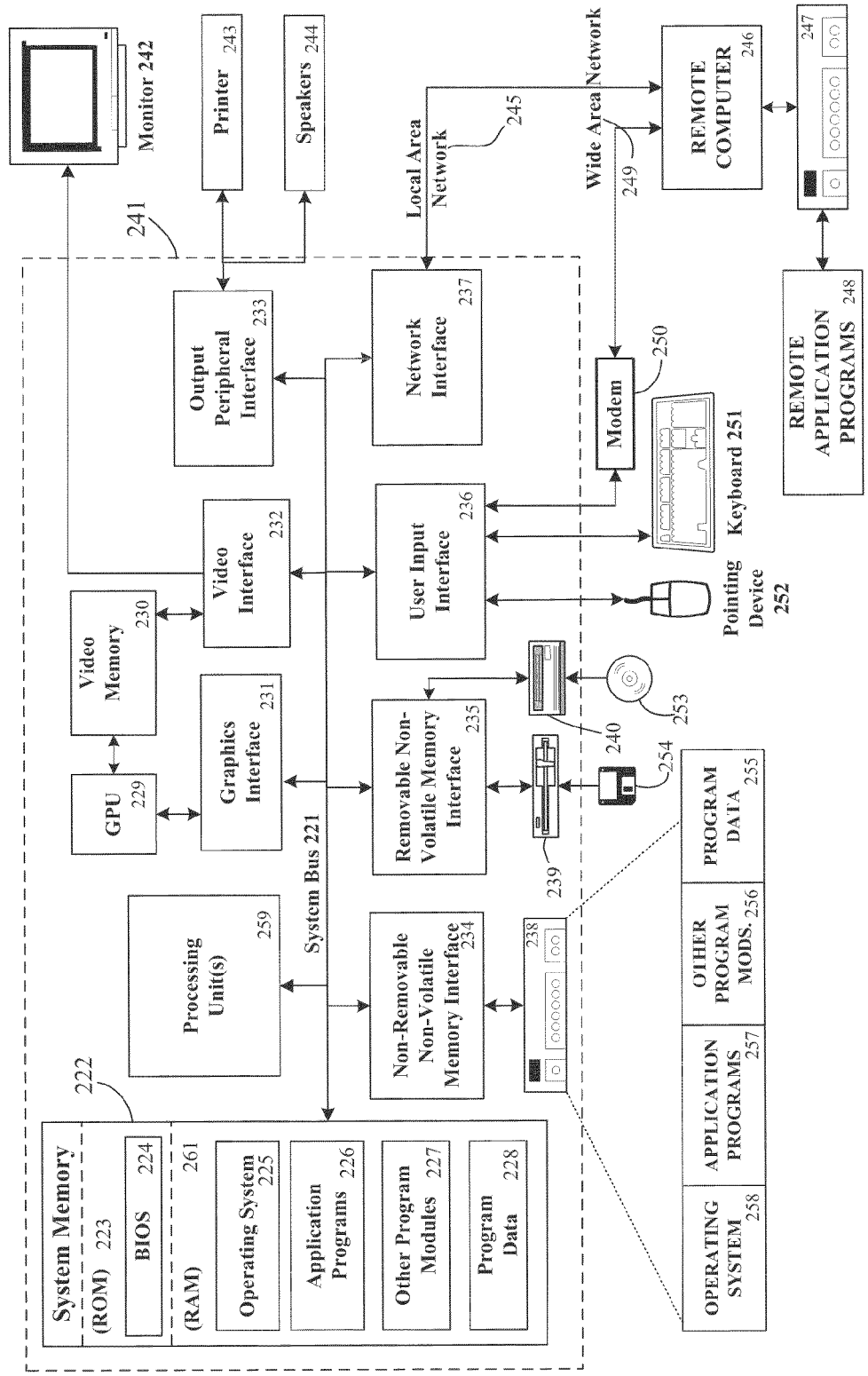
FIG. 8 illustrates another example embodiment of a computing environment in which the techniques described herein may be embodied.

FIG. 8 illustrates another example embodiment of a computing environment 220 that may be the computing environment 212 shown in FIG. 1 used to interpret one or more gestures in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 8, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 261. A basic input/output system 224 (BIOS), containing the basic routines that help to transfer information between elements within computer 241, such as during start-up, is typically stored in ROM 223. RAM 261 typically contains data and/or program modules that are immediately accessible to and/or presently being operated on by processing unit 259. By way of example, and not limitation, FIG. 8 illustrates operating system 225, application programs 226, other program modules 227, and program data 228.

The computer 241 may also include other removable/non-removable, volatile/nonvolatile computer storage media. By way of example only, FIG. 8 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 8, provide storage of computer readable instructions, data structures, program modules and other data for the computer 241. In FIG. 8, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 202 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 8. The logical connections depicted in FIG. 8 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 8 illustrates remote application programs 248 as residing on memory device 247. It will be appreciated that the network connections shown are exemplary and other means of establishing a communications link between the computers may be used.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Furthermore, while the present disclosure has been described in connection with the particular aspects, as illustrated in the various figures, it is understood that other similar aspects may be used or modifications and additions may be made to the described aspects for performing the same function of the present disclosure without deviating therefrom. The subject matter of the present disclosure includes all novel and non-obvious combinations and sub-combinations of the various processes, systems and configurations, and other features, functions, acts, and/or properties disclosed herein, as well as any and all equivalents thereof Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments.

In addition to the specific implementations explicitly set forth herein, other aspects and implementations will be apparent to those skilled in the art from consideration of the specification disclosed herein. Therefore, the present disclosure should not be limited to any single aspect, but rather construed in breadth and scope in accordance with the appended claims. For example, the various procedures described herein may be implemented with hardware or software, or a combination of both.

What is claimed:

1. A method for rendering a visual representation in a shared presentation experience, the method comprising:
   rendering a presentation of information;
   capturing data of a physical space, the captured data being representative of a plurality of users in the physical space;
   analyzing the plurality of users in the physical space represented in the captured data to recognize a specific identity of a first user of the plurality of users based at least in part on a body or facial feature of the first user, each user of the plurality of users in the physical space being unique;

accessing, based on the recognized, specific identity of the first user, a stored user profile for the first user that indicates whether the first user has access to present the presentation of information, access to the stored user profile being restricted based on the recognized, specific identity of the first user;

determining that the first user has access to present the presentation of information based on the stored user profile;

determining that the first user is able to control the rendered presentation of information based on determining that the first user has access to present the presentation; and rendering at least one visual representation that corresponds to each of the plurality of users, the at least one visual representation being adapted to interact with the rendered presentation of information.

2. The method of claim 1, wherein the at least one visual representation is adapted to interact with the rendered presentation of information via an animation that interacts with a portion of the presentation.

3. The method of claim 2, wherein the animation of the at least one visual representation corresponds to a gesture of at least one of the plurality of users.

4. The method of claim 2, further comprising applying the animation from an avatar library to the at least one visual representation.

5. The method of claim 1, wherein each of the plurality of users corresponds to a distinct visual representation.

6. The method of claim 1, wherein each of the plurality of users corresponds to a same visual representation.

7. The method of claim 1, wherein the at least one visual representation corresponds to a feature of a user detected by a capture device.

8. The method of claim 1, wherein a control of the presentation to at least one of the plurality of users may be indicated by a feature of the visual representation that corresponds to the at least one of the plurality of users.

9. The method of claim 1, further comprising:
capturing additional data of the physical space;
determining an identity of a second user of the plurality of users based on the additional captured data;
determining that the second user has performed a motion or pose indicative of a request to receive the presentation of information based on the additional captured data;
determining an email address of the second user based on the second user's identity; and
emailing the second user the presentation of information based on the second user's motion or pose.

10. The method of claim 1, further comprising:
capturing additional data of the physical space;
processing the additional data to determine a motion or pose of the second user;
processing the motion or pose of the second user to determine that it is indicative of a mental state of being inattentive or un-alert; and
notifying the first user of the second user's inattentiveness or un-alertness.

11. The method of claim 1, further comprising:
capturing additional data of the physical space;
determining that a second user of the plurality of users is inattentive or un-alert when a current portion of the presentation of information contains a large amount of text; and notifying the user that an upcoming portion of the presentation of information contains a large amount of text.

12. The method of claim 1, further comprising:
determining that a second user of the plurality of users lacks rights to interact with the rendered presentation of information; and
wherein rendering at least one visual representation that corresponds to each of the plurality of users comprises:
rendering the second user with an indication that the second user lacks rights to interact with the rendered presentation of information.

13. The method of claim 1, further comprising:
determining a level of access for a second user of the plurality of users to interact with the rendered presentation of information based on a location of the second user in the captured data of the physical space.

14. The method of claim 1, further comprising:
capturing additional data of the physical space;
determining that the first user has made an introduction with a second user of the plurality of users based on the additional data of the physical space;
determining a contact information of the first user based on the first user's identity; and
transmitting the first user's contact information to the second user based on the introduction between the first and second users.

15. The method of claim 1, further comprising:
capturing additional data of the physical space;
determining from the additional data that a second user of the plurality of users has not gestured for a period of time; and
wherein rendering at least one visual representation that corresponds to each of the plurality of users comprises:
rendering the second user with an indication that the second user is idle.

16. The method of claim 1, further comprising:
capturing additional data of the physical space;
determining from the additional data that a second user of the plurality of users has requested control to interact with the rendered presentation of information; and
granting the second user control to interact with the rendered presentation of information in response to the request.

17. A system, comprising:
a processor; and
a memory bearing processor-executable instructions that, when executed on the processor, cause the system at least to:
render a presentation of information;
capture data of a physical space, the captured data being representative of a plurality of users in the physical space;
analyze the plurality of users in the physical space represented in the captured data to recognize a specific identity of a first user of the plurality of users based at least in part on a body or facial feature of the first user, each user of the plurality of users in the physical space being unique;
access, based on the recognized, specific identity of the first user, a stored user profile for the first user that indicates whether the first user has access to present the presentation of information, access to the stored user profile being restricted based on the recognized, specific identity of the first user;
determine that the first user has access to present the presentation of information based on the stored user profile;

determine that the first user is able to control the rendered presentation of information based on determining that the first user has access to present the presentation; and render at least one visual representation that corresponds to each of the plurality of users, wherein the at least one visual representation is adapted to interact with the rendered presentation of information.

18. The system of claim 17, said memory further bearing computer-readable instructions that, when executed on the processor, cause the processor to perform operations comprising:

capturing additional data of the physical space;

processing the additional data to determine a motion or pose of the second user;

processing the motion or pose of the second user to determine that it is indicative of a mental state of being inattentive or un-alert; and notifying the first user of the second user's inattentiveness or un-alertness.

19. The system of claim 17, said memory further bearing computer-readable instructions that, when executed on the processor, cause the processor to perform operations comprising:

capturing additional data of the physical space;

determining that a second user of the plurality of users is inattentive or un-alert when a current portion of the presentation of information contains a large amount of text; and notifying the user that an upcoming portion of the presentation of information contains a large amount of text.

20. The system of claim 17, said memory further bearing computer-readable instructions that, when executed on the processor, cause the processor to perform operations comprising:

capturing additional data of the physical space;

determining an identity of a second user of the plurality of users based on the additional captured data;

determining that the second user has performed a motion or pose indicative of a request to receive the presentation of information based on the additional captured data;

determining an email address of the second user based on the second user's identity; and emailing the second user the presentation of information based on the second user's motion or pose.

* * * * *